(12) United States Patent
Zhu et al.

(10) Patent No.: US 8,710,213 B2
(45) Date of Patent: Apr. 29, 2014

(54) METHODS FOR INTEGRATING THE PRODUCTION OF CELLULOSE NANOFIBRILS WITH THE PRODUCTION OF CELLULOSE NANOCRYSTALS

(75) Inventors: JunYong Zhu, Madison, WI (US); Richard S. Reiner, Madison, WI (US)

(73) Assignee: The United States of America as Represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 13/472,137

(22) Filed: May 15, 2012

(65) Prior Publication Data
US 2013/0303750 A1 Nov. 14, 2013

Related U.S. Application Data

(63) Continuation-in-part of application No. 13/471,318, filed on May 14, 2012, now abandoned.

(51) Int. Cl.
*C08B 15/00* (2006.01)
*C08B 5/14* (2006.01)
*C08B 5/00* (2006.01)

(52) U.S. Cl.
CPC . *C08B 15/00* (2013.01); *C08B 5/14* (2013.01); *C08B 5/00* (2013.01)
USPC .................................. 536/56; 536/59; 536/58

(58) Field of Classification Search
CPC .............. C08B 15/00; C08B 5/14; C08B 5/00
USPC ................................................. 536/56, 59, 58
See application file for complete search history.

(56) References Cited

U.S. PATENT DOCUMENTS

| | | | |
|---|---|---|---|
| 3,232,933 | A | 2/1966 | Gundel |
| 4,266,981 | A | 5/1981 | Tsao |
| 5,252,117 | A | 10/1993 | Young |
| 6,955,775 | B2 | 10/2005 | Chung |
| 7,318,853 | B2 | 1/2008 | Chung |
| 8,012,573 | B2 | 9/2011 | Kowata |

FOREIGN PATENT DOCUMENTS

| | | |
|---|---|---|
| JP | 2010/104768 | 5/2010 |
| WO | 2010/116826 | 10/2010 |

OTHER PUBLICATIONS

Wegner T. H. & Jones E. P., "A Fundamental Review of the Relationships between Nanotechnology and Lignocellulosic Biomass", Nanoscience and Technology of Renewable Biomaterials, 2009, 1st Ed, 1-41.
Battista O. A., "Hydrolysis and Crystallization of Cellulose", Industrial and Engineering Chemistry, 1950, vol. 42, pp. 502-507.
Mukherjee S. M., & Woods H. J., "X-Ray and Electron Microscope Studies of the Degradation of Cellulose by Sulphuric Acid", Biochemica Et Biophysica Acta, 1953, vol. 10, pp. 499-511.
Nickerson R. F. & Harble J. A., "Cellulose Intercrustalline Structure", Industrial and Engineering Chemistry, 1947, vol. 39, pp. 1507-1512.
Bondeson D., Matthrew A., and Oksman K., "Optimization of the Isolation of Nanocrystals from Microcrystalline Cellulose by Acid Hydrolysis", Cellulose, 2006, vol. 13, pp. 171-180.
Ranby B. G., "Fibrous Macromolecular Systems. Cellulose and Muscle. The Colloidal Properties of Cellulose Micelles ", Discussions Faraday Society, 1951, vol. 11, pp. 158-164.
Hamad W. Y, "Development of Properties of Nanocrystalline Cellulose", American Chemical Society, 2011, vol. 12, pp. 301-321.
Chen Y., Liu C., Chang P. R., Cao X, and Anderson D. P., "Bionanocomposites Based on Pea Starch and Cellulose Nanowhiskers Hydrolyzed from Pea Hull Fibre: Effect of Hydrolysis Time", Carbohydrate Polymers, 2009, vol. 76, pp. 607-615.
Moran J. I., Alvarez V. A., Cyras V. R, and Vazquez A., "Extraction of Cellulose and Preparation of Nanocellulose from Sisal Fibers", Cellulose, 2008, vol. 15 pp. 149-159.
Dong X. M., Revol J-F., and Gray D. G., "Effect of Microcrystallite Preparation Conditions on the Formation of Colloid Crystals of Cellulose", 1998, Cellulose, vol. 5, pp. 19-32.
Nakagaito A. N. & Yano. H., "The Effect of the Morphological Changes From Pulp Fiber Towards Nano-Scale Fibrillated Cellulose on the Mechanical Properties of High-Strength Plant Fiber Based Composites", Applied Physics A, 2004, vol. 78, pp. 547-552.
Iwamoto S., Nakagaito A. N., and Yano. H., "Nano-Fibrillation of Pulp Fibers for the Processing of Transparent Nanocomposites", Applied Physics A, 2007, vol. 89, pp. 461-466.
Alemdar A., & Sain, M., "Isolated and Chracterization of Nanofibers from Agricultural Residues—Wheat Straw and Soy Hulls", Bioresource Technology, vol. 99, 2008, pp. 1664-1671.
Andresen M., Johansson L-S, Tanem B. S., Stenius P., "Properties and Characterization of Hydrophobized Microfibrillated Cellulose", 2006, vol. 13, Cellulose, pp. 665-677.
Chum H. L., Johnson D. K., Anzick R., and Baldwin R. M., "Prepartion of Lignin-Derived Pasing Oil", Applied Biochemistry and Biotechnology, 1990, vol. 24/25, pp. 1-14.
Hamad W. Y. & Hu T. Q., "Structure-Process-Yield Interrelations in Nanocrystalline Cellulose Extraction", The Canadian Journal of Chemical Engineering, Jun. 2010, vol. 88, pp. 392-402.
Beck-Candanedo S., Roman M., Gray D. G, "Effect of Reaction Conditions on the Properties and Behavior of Wood Cellulose Nanocrystal Suspensions", Biomacromolecules, 2005, vol. 6, pp. 1048-1054.
Franson M. H., "Standard Methods for the Examination of Water and Wastewater", American Public Health Association (APHA), 1985, 16th Ed, pp. 532-537.
Stamm A. J., Wood and Cellulose Science, 1964, 549pp.

*Primary Examiner* — Brandon Fetterolf
*Assistant Examiner* — Yih-Horng Shiao
(74) *Attorney, Agent, or Firm* — John D. Fado; Lesley D. Shaw; Janet I. Stockhausen

(57) ABSTRACT

Methods for integrating the production of cellulose nanocrystals (CNC) and cellulose nanofibrils (CNF) from cellulose are provided. The methods use milder acid hydrolysis conditions than those for maximal CNC production to achieve reduced degradation of cellulose into soluble sugars. Also provided are negatively charged cellulosic solid residues (CSRs) in the form of cellulose fibers (CF) and/or cellulose microfibrils (CMF) during the acid hydrolysis, as well as CNFs fabricated from the CSRs.

19 Claims, 21 Drawing Sheets

Table 1 Chemical composition of the bleached Eucalyptus dry lab pulp

| Substrate | Lignin | Arabinan | Galactan | Glucan | Xylan | Mannan |
|---|---|---|---|---|---|---|
| Bleached Eucalyptus Pulp | 0.7% | n.d. | n.d. | 78.1% | 15.5% | n.d. |

FIG. 13

Table 2. Experimental conditions for the first set of acid hydrolysis experiments

| Run Order | Acid Concentration (%) | Temperature (°C) | Duration (min) | Acid Level | T Level | Duration Level |
|---|---|---|---|---|---|---|
| 1 | 45 | 50 | 75 | -1 | 0 | 0 |
| 2 | 55 | 65 | 75 | 0 | 1 | 0 |
| 3 | 55 | 50 | 75 | 0 | 0 | 0 |
| 4 | 55 | 50 | 75 | 0 | 0 | 0 |
| 5 | 50 | 55 | 102 | -1 | 1 | 1 |
| 6 | 55 | 50 | 75 | 0 | 0 | 0 |
| 7 | 55 | 35 | 75 | 0 | -1 | 0 |
| 8 | 50 | 55 | 48 | -1 | 1 | -1 |
| 9 | 50 | 45 | 48 | -1 | -1 | -1 |
| 10 | 55 | 50 | 30 | 0 | 0 | -1 |
| 11 | 60 | 55 | 102 | 1 | 1 | 1 |
| 12 | 60 | 45 | 102 | 1 | -1 | 1 |
| 13 | 50 | 45 | 102 | -1 | -1 | 1 |
| 14 | 60 | 55 | 48 | 1 | 1 | -1 |
| 15 | 65 | 50 | 75 | 1 | 0 | 0 |
| 16 | 55 | 50 | 120 | 0 | 0 | 1 |
| 17 | 60 | 45 | 48 | 1 | -1 | -1 |

FIG. 14

Table 3. Experimental conditions for the second set of acid hydrolysis experiments

| Run Order | Acid Concentration (%) | Temperature (°C) | Duration (min) | Acid Level | T Level | Duration Level |
|---|---|---|---|---|---|---|
| 1 | 55 | 50 | 70 | -1 | 0 | 0 |
| 2 | 62 | 60 | 70 | 0 | 1 | 0 |
| 3 | 62 | 50 | 70 | 0 | 0 | 0 |
| 4 | 62 | 50 | 70 | 0 | 0 | 0 |
| 5 | 58 | 56 | 100 | -1 | 1 | 1 |
| 6 | 62 | 50 | 70 | 0 | 0 | 0 |
| 7 | 62 | 40 | 70 | 0 | -1 | 0 |
| 8 | 58 | 56 | 40 | -1 | 1 | -1 |
| 9 | 58 | 44 | 40 | -1 | -1 | -1 |
| 10 | 62 | 50 | 20 | 0 | 0 | -1 |
| 11 | 66 | 56 | 100 | 1 | 1 | 1 |
| 12 | 66 | 44 | 100 | 1 | -1 | 1 |
| 13 | 58 | 44 | 100 | -1 | -1 | 1 |
| 14 | 66 | 56 | 40 | 1 | 1 | -1 |
| 15 | 69 | 50 | 70 | 1 | 0 | 0 |
| 16 | 62 | 50 | 120 | 0 | 0 | 1 |
| 17 | 66 | 44 | 40 | 1 | -1 | -1 |

FIG. 15

Table 4. Yields and sulfur contents of CNC and cellulose solid residual (CSR) from the wide range acid hydrolysis experiments for first experimental design listed in Table 2

| Run Order | EP - CNC yield (%) | P - CNC yield by COD (%) | EP - CSR yield by drying (%) | P - CSR yield (%) by drying | EP - Total yields (%) | P - Total yield (%) | EP - CNC Sulfur mg/g | P - CNC Sulfur mg/g |
|---|---|---|---|---|---|---|---|---|
| 1 | 4.19 | 0.46 | 77.0 | 83.4 | 81.1 | 83.9 | | |
| 2 | 17.63 | 23.59 | 63.6 | 60.1 | 81.3 | 83.7 | 6.74 | 5.69 |
| 3 | 5.41 | 2.21 | 72.1 | 84.7 | 77.5 | 87.0 | | |
| 4 | 4.30 | 1.75 | 67.2 | 84.0 | 71.5 | 85.7 | | |
| 5 | 3.42 | 1.14 | 71.0 | 92.5 | 74.4 | 93.6 | | |
| 6 | 5.73 | 0.93 | 68.8 | 86.6 | 74.5 | 87.6 | | |
| 7 | 0.52 | 0.23 | 84.0 | 91.8 | 84.5 | 92.0 | | |
| 8 | 1.56 | 0.36 | 81.8 | 92.6 | 83.3 | 92.9 | | |
| 9 | 1.46 | 0.44 | 87.5 | 90.1 | 88.9 | 90.6 | | |
| 10 | 0.39 | 0.47 | 83.4 | 88.4 | 83.8 | 88.9 | | |
| 11 | 31.96 | 39.54 | 41.9 | 31.7 | 73.9 | 71.2 | 13.03 | 8.54 |
| 12 | 15.23 | 21.01 | 63.8 | 58.7 | 79.0 | 79.7 | 25.06 | 7.91 |
| 13 | 3.11 | 0.63 | 84.1 | 88.8 | 87.2 | 89.4 | | |
| 14 | 24.58 | 30.67 | 54.3 | 48.3 | 78.9 | 79.0 | 7.10 | 7.09 |
| 15 | 24.54 | 27.31 | 6.7 | 5.1 | 31.2 | 32.5 | 12.68 | 11.29 |
| 16 | 4.85 | 6.87 | 70.1 | 69.5 | 74.9 | 76.4 | | |
| 17 | 2.88 | 4.12 | 80.9 | 77.1 | 83.8 | 81.2 | | |

FIG. 16

Table 5. Yields and sulfur contents of CNC and cellulose solid residual (CSR) from the narrow range acid hydrolysis experiments for second experimental design listed in Table 3.

| Run Order | CNC yield-I by COD (%) | CNC yield-II by COD (%) | CNC yield-II repeat (%) | Mean CNC yield (%) | STD CNC yield (%) | CSR yield by COD (%) | CSR Yield repeat (%) | CSR yield by drying (%) | CSR yield (%) | Total yields (%) | CNC Sulfur mg/g | CSR Sulfur mg/g |
|---|---|---|---|---|---|---|---|---|---|---|---|---|
| 1 | 8.12 | 7.26 | | 7.7 | 0.61 | 48.17 | 77.16 | 41.68 | 41.68 | 49.4 | 8.81 | 3.89 |
| 2 | 51.80 | 50.03 | | 50.9 | 1.25 | 1.97 | | | 1.97 | 52.9 | 10.47 | 8.65 |
| 3 | 55.20 | 53.92 | | 54.6 | 0.91 | 1.28 | | | 1.28 | 55.8 | 8.73 | 8.31 |
| 4 | 54.06 | 52.34 | | 53.2 | 1.22 | 0.68 | | | 0.68 | 53.9 | 8.77 | 153.54 |
| 5 | 54.73 | 57.01 | 55.30 | 55.7 | 1.19 | 25.93 | | 17.41 | 17.41 | 73.1 | 6.83 | 5.24 |
| 6 | 58.87 | 60.48 | | 59.7 | 1.14 | 0.96 | | | 0.96 | 60.6 | 7.92 | 6.26 |
| 7 | 32.35 | 29.76 | | 31.1 | 1.83 | 37.05 | 34.74 | 25.55 | 25.55 | 56.6 | 11.14 | 4.55 |
| 8 | 27.45 | 27.45 | | 27.5 | 0.00 | 66.53 | 64.60 | 56.69 | 56.69 | 84.1 | 6.29 | 2.96 |
| 9 | 4.67 | 3.74 | | 4.2 | 0.66 | 58.40 | 70.41 | 72.88 | 72.88 | 77.1 | 13.39 | 3.04 |
| 10 | 36.13 | 36.62 | 34.57 | 35.8 | 1.07 | 26.78 | 26.21 | 18.61 | 18.61 | 54.4 | 9.36 | 5.25 |
| 11 | 6.61 | 5.73 | | 6.2 | 0.62 | 2.65 | | | 2.65 | 8.8 | 19.94 | 6.91 |
| 12 | 2.81 | 7.51 | 2.76 | 4.4 | 2.73 | 0.18 | | | 0.18 | 4.5 | 28.09 | 11.67 |
| 13 | 16.15 | 16.15 | | 16.2 | 0.00 | 20.36 | 72.00 | 61.33 | 61.33 | 77.5 | 5.58 | 14.65 |
| 14 | 7.97 | 11.95 | | 10.0 | 2.81 | 1.39 | | | 1.39 | 11.4 | 12.67 | 3.01 |
| 15 | 1.77 | 1.55 | 1.39 | 1.6 | 0.19 | 3.56 | | | 3.56 | 5.1 | 50.58 | 5.87 |
| 16 | 51.95 | 50.24 | | 51.1 | 1.21 | 1.73 | | | 1.73 | 52.8 | 9.77 | 9.09 |
| 17 | 11.43 | 11.93 | 10.94 | 11.4 | 0.50 | 0.49 | | | 0.49 | 11.9 | 46.66 | 9.74 |
| Mean | 56.04 | 55.58 | | 55.8 | 3.17 | 0.97 | | | 0.97 | 56.8 | 8.47 | 7.29 |
| STD | 2.51 | 4.32 | | 3.17 | | 0.30 | | | 0.30 | | 0.48 | 1.44 |

FIG. 17

METHODS FOR INTEGRATING THE PRODUCTION OF CELLULOSE NANOFIBRILS WITH THE PRODUCTION OF CELLULOSE NANOCRYSTALS

REFERENCE TO GOVERNMENT RIGHTS

This invention is owned by the federal government. The government has certain rights in the invention.

BACKGROUND

Cellulose as a structural material is extremely strong with a theoretical modulus of around 250 GPa or a specific tensile strength of about 5200 kN-m/kg or about 18 times that of titanium. However, most cellulose is naturally present in plant lignocellulosic biomass as a biocomposite made of cellulose, hemicelluloses, lignin, etc., with a hierarchical structure. (Wegner et al., *A fundamental review of the relationships between nanotechnology and lignocellulosic biomass*, in The Nanoscience and Technology of Renewable Biomaterials. 1$^{st}$ ed: John Wiley and Sons, p. 1-41 (2009).) Existing manufacturing technology has focused primarily on producing papermaking fibers as one of the largest utilizations of lignocellulose. Advanced separation techniques are required to effectively liberate cellulose from lignocellulosic biomass in the forms of nano-crystals and nanofibrils made of elemental crystals or elemental fibrils, respectively. These cellulose nanocrystals (CNC) or nanofibrils (CNF) have very special mechanical and optical properties and have been identified as a powerful building block for producing high-quality, durable, light weight, and cost-effective products for a variety of applications.

There are several approaches for CNC and CNF production from cellulose. The acid hydrolysis approach was developed in the 1940s and 1950s and remains a primary process for CNC production. (Battista O. A., *Industry and Engineering Chemistry* 42(3):502-507 (1950); Mukherjee et al., *Biochimica et Biophysica Acta* 10:499-511 (1953); Bondeson et al., *Cellulose* 13:171-180 (2006); Chen et al., *Carbohydrate Polymers* 76(4):607-615 (2009); Moran et al., *Cellulose* 15:149-159 (2008).) Hydrocholoric acid was used in early studies with typical acid concentrations between 2.5 N to 6.0 N. (Battista et al., *Industry and Engineering Chemistry* 42(3): 502-507 (1950); Nickerson et al., *Ind. Eng. Chem.* 39:1507-1512 (1947).) Sulfuric acid was later used at a concentration of 2.5 N or 22 wt. % for a period of one hour or longer at boiling conditions to disintegrate cellulose. (Nickerson et al., *Ind. Eng. Chem.* 39:1507-1512 (1947).) Nickerson and Habrie found that the amount of cellulose hydrolyzed was less than 25% from glucose measurements even after 8 hours hydrolysis. RAnby found that after several hours of hydrolysis, cellulose sol composed of cellulosic whiskers were obtained through centrifugation of the unhydrolyzed cellulose at 1000 g for 15 min. (Rånby B. G., *Discussions Faraday Soc.* 11:158-164 (1951).) However the yield of cellulosic whiskers was only about 30-40%.

The use of very strong acid (over 50 wt. %) in the acid hydrolysis was first reported by Mukherjee and Woods. (Mukherjee et al., *Biochimica et Biophysica Acta* 10:499-511 (1953).) They were able to hydrolyze cellulose into colloidal nano-whiskers or CNCs with good dispersing properties when an acid concentration of approximately 65 wt. % was used. Hydrolysis durations were tens of hours at temperatures between 20 to 40° C. Their process conditions, however, resulted in a very low CNC yield of approximately 30%. Using a sulfuric acid concentration of approximately 64 wt. %, the reaction time could be reduced to a couple of hours or less at temperatures between 45-50° C. (Beck-Candanedo et al., *Biomacromolecules* 6:1048-1054 (2006); Bondeson et al., *Cellulose* 13:171-180 (2006); Chen et al., *Carbohydrate Polymers* 76(4):607-615 (2009); Dong et al., *Cellulose* 5:19-32 (1998); Hamad et al., *The Canadian J. Chemical Engineering* 88:392-402 (2010).) An acid hydrolysis process optimization study using a commercial microcrystalline cellulose as feedstock was conducted using a sulfuric acid concentration ranging from 44.1 to 64.8 wt. %, temperatures from 40 to 80° C., hydrolysis duration from 10 to 120 min. and cellulose consistency from 5 to 15%. (Bondeson et al., *Cellulose* 13:171-180 (2006).) Total cellulosic solids reported varied from 0 to 95%. Partial flow birefringence was observed from some of the resultant cellulosic solid suspensions with a relatively high concentration of sulfate groups. However, the resultant cellulosic solid from runs with yields higher than 47% were agglomerates rather than colloidal suspension of CNC. Separation of the agglomerates was not attempted to verify whether or not CNC was produced. The optimal condition for CNC production was found at an acid concentration of 63.5 wt. % and a temperature of 44° C. for 130 min. using a cellulose concentration of 10% with CNC yield of approximately 30%.

The extent of sulfation and/or the degree of polymerization (DP) have been indentified as indicators for the existence of CNCs. (Hamad et al., in Sustainable Production of Fuels, Chemicals, and Fibers from Forest Biomass. Washington, D.C.: *American Chemical Society*, p. 301-321 (2011).) Hamad and Hu have conducted hydrolysis of a softwood Kraft pulp using sulfuric acid concentrations of 16, 40, and 64 wt. % at 45, 65, and 85° C. for periods between 5 to 25 min. (Hamad et al., *The Canadian J. Chemical Engineering* 88:392-402 (2010).) They found that the total cellulosic solid yield was a constant at approximately 90% for DP above 120, but reduced abruptly when DP was reduced below 120, suggesting the cellulose was significantly deploymerized and in the form of CNCs. It appeared that there was no CNC produced at the two low acid concentrations with substrate DP greater than 120 and a lack of sulfate groups. The resultant cellulosic solids were identified as partially hydrolyzed pulp without sulfate esters, suggesting that no CNC was produced. Attempts to separate the hydrolyzed pulp to verify the existence of CNCs were not reported. The sulfate groups were detected in the resultant cellulosic solids only at the sulfuric acid concentration of 64% (w/w) at 65° C. for periods of 5, 15, 25 min. or at 45° C. or higher for 25 min. The yields, however, were below 40%.

The production of CNC has conventionally been separated from CNF production. Strong acid hydrolysis, as described above, has been used for CNC production, while mechanical processing with and without chemical or enzymatic preprocessing has been employed for CNF production. Mechanical methods, such as shearing and homogenization, used to produce CNF are described in Alemdar et al., *Bioresource Technology* 99:1664-1671 (2008); Andresen et al., *Cellulose* 13:665-677 (2006); Iwamoto et al., *Applied Physics A: Materials Science and Processing* 89:461-466 (2007); Nakagaito et al., *Applied Physics A: Materials Science and Processing* 78:547-552 (2004).) A solely mechanical method to produce CNFs from plant biomass is very energy intensive. Although, chemical and enzymatic pretreatments can reduce this energy consumption.

SUMMARY

Methods for integrating the production of cellulose nanocrystals with the production of other elongated cellulose particles, such as cellulose nanofibrils (CNFs), are provided. Also provided are negatively-charged, cellulose particles fabricated using the present methods. These negatively-charged cellulose particles include cellulose fibers, cellulose microfibers and cellulose nanofibrils.

One aspect of the technology described herein provides methods for the production of cellulose nanofibrils from a cellulosic materials comprising crystalline cellulosic components and amorphous cellulosic components. The methods comprise: at least partially hydrolyzing hemicellulosic and amorphous cellulosic components in the cellulosic materials via acid hydrolysis to obtain a crystalline cellulosic solids material comprising cellulose nanocrystals (CNCs) and cellulosic solid residues (CSRs), the cellulosic solid residues comprising cellulose fibrils, cellulose microfibers, or a combination thereof; separating the cellulose nanocrystals from the cellulosic solid residues; and forming cellulose nanofibrils (CNFs) from the separated cellulosic solid residues. The cellulose nanofibrils can be formed, for example, by subjecting the cellulosic solid residues to mechanical shear forces, whereby the cellulose nanofibers are formed.

Depending upon the acid used and the hydrolysis conditions, the methods can be used to fabricate cellulosic solid residues and cellulosic nanofibrils having surface ester functionalities. For example, in some embodiments, the acid used in the acid hydrolysis comprises sulfuric acid, such that the cellulosic solid residues and the cellulose nanofibrils comprise surface sulfate ester functionalities. While in other embodiments, the acid used in the acid hydrolysis comprises phosphoric acid, such that the cellulosic solid residues and the cellulose nanofibrils comprise surface phosphate ester functionalities.

By integrating the fabrication of cellulose nanofibrils with the production of cellulose nanocrystals, the present methods can achieve near zero cellulose loss and high cellulosic solid yields. For example, some embodiments of the methods provide a total cellulosic solid yield of at least 55%. This includes embodiments that provide a total cellulosic solid yield of at least 73%, which in some cases approaches the cellulosic solids content of the cellulosic materials used as the starting materials.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 13 Table 1 Chemical composition of the bleached Eucalyptus dry lab pulp.

FIG. 14 Table 2. Experimental conditions for the first set of acid hydrolysis experiments.

FIG. 15 Table 3. Experimental conditions for the second set of acid hydrolysis experiments.

FIG. 16 Table 4. Yields and sulfur contents of CNC and cellulose solid residual (CSR) from the wide range acid hydrolysis experiments for first experimental design listed in Table 2.

FIG. 17 Table 5. Yields and sulfur contents of CNC and cellulose solid residual (CSR) from the narrow range acid hydrolysis experiments for second experimental design listed in Table 3.

DETAILED DESCRIPTION

Figure 1:
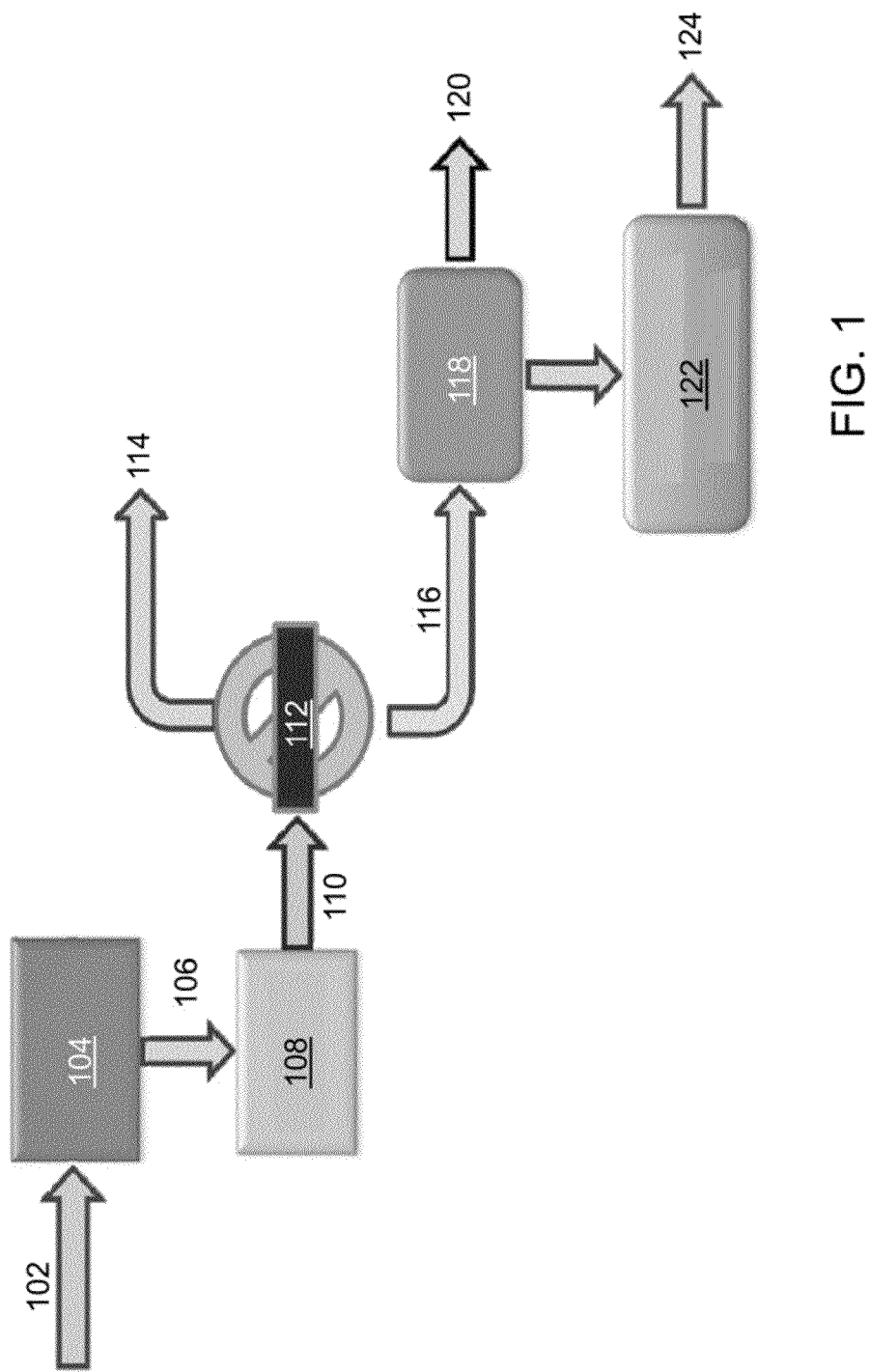
FIG. 1 Schematic process diagram for the integrated production of CNCs and CNFs.

Methods for integrating the production of cellulose nanocrystals (CNC) and cellulose nanofibrils (CNF) from cellulose are provided. The methods use milder acid hydrolysis conditions than those conventionally used for maximal CNC production to achieve reduced degradation of cellulose into soluble sugars. Also provided are negatively-charged cellulosic solid residues (CSRs) in the form of cellulose fibers (CF) and/or cellulose microfibrils (CMF) during the acid hydrolysis, as well as CNFs fabricated from the CSRs.

Aspects of the technology described herein are based, at least in part, on the inventors' realization that acid hydrolysis of cellulosic materials can be conducted under conditions that yield cellulosic solids comprising CNCs in combination with other non-CNC cellulose solids, referred to as CSRs, and that these CSRs can be used as a feedstock in the production of CNFs. The acid hydrolysis can be carried out under conditions that provide substantial yields for both the CNCs and CSRs, while minimizing cellulose loss due to degradation into soluble sugars. As a result, the present methods are able to provide high total cellulosic solid yields. In some cases, these high total cellulosic yields are achieved without reducing the CNC yield.

Because the nomenclature used to describe cellulose particles has not been stardardized and some terms may be used inconsistently within the literature, definitions for the various types of cellulose particles referred to in this disclosure are provided below.

Cellulosic Material: As used herein, the term cellulosic material refers to a substance that comprises cellulose, hemicellulose, and lignin, and, optionally, a trace amount of other wood or lignocellulosic biomass components.

Cellulose Nanocrystals (CNCs): As used herein, the term CNC refers to elongated rod-like crystalline cellulose nanoparticles. CNCs comprise cellulose chains extracted from natural cellulosic materials by depolymerizing the amorphous cellulose using acid. CNCs can be in the form of single cellulose crystallite or a bundle of cellulose crystallites. "Cellulose crystallites" are described in Stamm A. J. 1964. *Wood and Cellulose Science.* New York: The Ronald Press Company. 549 p. CNCs are characterized by lengths in the range from about 60 to about 1000 nm; widths in the range from about 5 to about 50 nm; and corresponding aspect ratios in the range from about 1 to about 200. CNCs are sometimes referred to as nanocellulose crystals (NCCs), or cellulose nanowhsikers (CNW).

Cellulose Nanoflbrils (CNFs): As used herein, the term CNF refers to long flexible fiber-like cellulose nanoparticles. CNFs can be branched or unbranched and can take the form of a network of flexible fiber-like nanoparticles. CNFs comprise cellulose, hemicellulose, and, optionally, even lignin. The fiber-like cellulose particles are characterized by lengths in the range from about 100 to about 5,000 nm; widths in the range from about 5 to about 200 nm; and corresponding aspect ratios in the range from about 2 to about 1,000. CNFs are sometimes referred to as Nanocellulose fibrils (NFC) or nanofibers.

Cellulose Fibers (CFs): As used herein, the term CF refers to cellulose particles. CFs comprise cellulose, hemicellulose, and, optionally, lignin. CFs are characterized by lengths in the range from about 0.05 to about 3 mm; widths in the range from about 5 to about 50 μm; and corresponding aspect ratios in the range from about 2 to about 500. CFs are sometimes referred to as fibers or fines.

Cellulose Microflbers (CMFs): As used herein, the term CMF refers to cellulose microparticles. CMFs comprise cellulose, hemicelluloses and, optionally, lignin. CMFs are characterized by lengths in the range from about 5 to about 50 μm; widths in the range from about 0.1 to about 5 μm; and corresponding aspect ratios in the range from about 2 to about 500. CMFs are sometimes referred to as cellulose microfibrils (CMFs), microcellulose fibers (MCFs), microcellulose fibrils.

Cellulosic Solid Residues (CSRs): As used herein, the term cellulosic solid residue refers to a solid material composed of CFs CMFs or a combination thereof. In the present methods, CSRs are the solid material remaining after separating out the CNC produced via acid hydrolysis from a starting cellulosic substance that may contain cellulose, hemicellulose, and, optionally, lignin.

The present methods for forming cellulose particles, such as CNCs, CSRs and CNFs, from cellulosic materials derived from natural sources of cellulose involve the step of subjecting a cellulosic material to an acid hydrolysis in order to at least partially hydrolyze amorphous cellulosic components and isolate the remaining solid cellulosic components in the form of CNCs and CSRs. The CSRs can then be separated from the CNCs and, optionally, used as feedstock for the formation of CNFs. As such, the present methods provide for the integrated production of both CNCs and CNFs starting from the same cellulose source material, desirably with minimal loss of cellulose.

A schematic diagram of an embodiment of a process flow for integrating the production of CNCs and CNFs is shown in FIG. 1. As shown here, a cellulosic material 102 undergoes acid hydrolysis 104 to produce a blend of CNCs and CNFs 106 which may then be subjected to dialysis 108 for purification. The purified product 110 is then filtered 112 in order to separate the CNCs 114, which come out in the supernatant, from the CSRs 116. The CSRs can then be washed 118 with water and dried to provide a final CSR product 120 comprising CFs and CMFs. Alternatively, the CSRs can be used as a feedstock in a mechanical shearing process 122 to form CNFs 124.

The cellulosic material that is used as the starting material in the acid hydrolysis is typically a material that is composed predominantly of cellulose and hemicelluloses with a small amount of lignin. Thus, a cellulosic material for use as a starting material in the present methods is one that comprises at least about 80 weight percent (wt. %) cellulose and hemicellulose and not more than about 20 wt. % lignin, where the recited wt. % values are based on the solids content of the material. In some embodiments, the methods may use cellulosic materials having significantly higher cellulose and hemicellulose contents (e.g., ≥85 wt. %, ≥90 wt. %, ≥95 wt. %, ≥99 wt. %) and significantly lower lignin contents (e.g., ≤15 wt. %, ≤10 wt. %, ≤5 wt. %, ≤1 wt. %). The cellulosic material can be made by pre-treating natural cellulose source materials (e.g., lignocellulosic biomass) to partially or completely remove matrix materials, such as lignin and hemicelluloses to provide a purified cellulosic material. Natural cellulose source materials include wood, plants, tunicates, algae and bacteria. Bleached wood pulp is an example of a purified cellulosic material derived from a natural cellulose source.

The cellulose in the cellulosic material will include both crystalline and amorphous components. Specifically, natural cellulose fibrils will include crystalline domains, in which the polymeric cellulose chains are highly ordered, and amorphous domains, in which the cellulose chains are disordered. Acid hydrolysis is used to hydrolyze the amorphous components into soluble sugars, such that the remaining solid components can be isolated and extracted.

In the present methods the acid hydrolysis conditions are controlled such that the isolated solids include both CNCs and CSRs with limited cellulose loss due to degradation into soluble sugars. This can be accomplished by using hydrolysis conditions that are less severe than those conventionally employed to maximize CNC yield. The severity of the acid hydrolysis conditions can be controlled via several parameters including the nature and concentration of the acid used, the hydrolysis temperature and the duration of the hydrolysis. The interplay of these parameters is illustrated in the examples provided below. These examples are illustrative and provide guidance as to how the hydrolysis conditions can be adjusted to tailor the solids content of the hydrolysis product. The examples are not intended to be limiting and hydrolysis conditions outside of those explicitly recited in the examples can be used in the present methods.

The acid used in the acid hydrolysis is desirably an acid that is capable of providing CSRs having a negative charge due to the presence of surface ester functionalities. Thus, sulfuric acid and phosphoric acid are well-suited for use in the methods because they can introduce negative charges on the surfaces of the CSRs (and CNCs) via esterification reactions with the acid anions. The introduction of negative charges is advantageous because it imparts improved aqueous dispersion properties, which facilitate subsequent aqueous phase processing, and because it also facilitates nanofibrillation of the CSRs to form CNFs.

Once formed, the CSRs can be separated from the CNCs using, for example, conventional filtration and/or centrifugation techniques to provide a high purity CSR material. Although, the separated solid products corresponding to the CNCs and the CSRs may each contain small amounts of the other product, each will be composed predominantly of either CNCs or CSRs, respectively. Therefore, the separated products may be characterized by maximums in their cellulose particle length and width distributions that fall within the length and width ranges defined above for each type of particle. In some embodiments the resulting CSR material comprises CNCs at a concentration of no more than 5 wt. % based on the solids content of the material. This includes embodiments comprising CNCs at a concentration of no more than 1 wt. %.

The CSRs obtained from the acid hydrolysis are themselves a useful product for a broad range of applications. For example, the CSRs can be incorporated into coatings, such as barrier coatings or antimicrobial coatings, or other films. They can also be used as reinforcing fillers in polymer composites or as thickening agents. Alternatively, the CSRs can be used as a starting material for the formation of CNFs.

CNFs can be fabricated from the CSRs using mechanical refining. For example, CNFs can be formed via mechanical shearing and homogenization, whereby the CSRs are subjected to high mechanical shear forces which results in the fibrillation of the CSRs to create the CNFs. The use of the CSRs as a feedstock for CNF formation is advantageous because the acid exposure during the hydrolysis weakens the cellulose chains and facilitates dispersion of the nanofibrils. Furthermore, the sulfation of the CSRs can facilitate fibrillation. In addition, because the CSR starting materials can themselves be ester-functionalized, the CNFs can be fabricated with surface ester functionalities.

The integrated production of CNCs and CNFs is able to provide substantially improved cellulosic solid yields without decreasing, or without significantly decreasing, CNC yield compared with conventional techniques that separate the production of CNCs from the production of CNFs. Thus, in some embodiments, the present methods provide a total cellulosic solid yield (i.e., total CNC, CSR and CNF solids), based on the total cellulose content of the cellulosic material used as the starting material, of at least 55%. This includes embodiments in which the total cellulosic solid yield is at least 70%, at least 80% and at least 85%.

The total cellulosic solid yield can be broken down into the solid yield for the CNCs and CSRs. Thus, in some embodiments, the total CNC yield is at least 10%. This includes embodiments in which the total CNC yield is at least 25%, further includes embodiments in which the total CNC yield is at least 30%, and still further includes embodiments in which the total CNC yield is at least 55%. Similarly, in some embodiments, the total CSR yield is at least 5%. This includes embodiments in which the total CSR yield is at least 25% and further included embodiments in which the total CSR yield is at least 50%. Thus, in some embodiments, the cellulosic solids material produced by the acid hydrolysis comprises more CSR than CNC. In other embodiments, the cellulosic solids material produced by the acid hydrolysis comprises more CNC than CSR.

The high solid yields are due, at least in part, to the use of acid hydrolysis conditions that reduce or minimize the loss of cellulose due to degradation into soluble sugars. Thus, in some embodiment of the present methods, cellulose loss to degradation into soluble sugars is no greater than 45%. This includes embodiments in which cellulose loss to degradation into soluble sugars is no greater than 25%, further includes embodiments in which cellulose loss to degradation into soluble sugars is no greater than 1% and still further includes embodiments in which cellulose loss to degradation into soluble sugars is no greater than 5%.

The solid yields of the cellulosic solids that are the produce of the present methods can be measured on a chemical oxygen demand (COD) basis, as illustrated in the Examples, below.

EXAMPLES

The following examples provide a non-limiting illustration of the use of the present methods to integrate the production of CNCs with the fabrications of CNFs.

Example 1

Materials and Methods

Sulfuric acid was used as received from Sigma-Aldrich (St. Louis, Mo.). A bleached Kraft eucalyptus dry lap pulp (Aracruz Cellulose, Brazil) was used. The chemical composition of the eucalyptus pulp is listed in Table 1 (shown in FIG. 13). The dry lap was soaked in water overnight and then dewatered by vacuuming after disintegration by a disintegrator (Model 73-06-01, TMI, Ronkonkoma, New York, USA) for 5000 revolutions at 312 rpm and 5% consistency at room temperature. The dewatered pulp was then air dried to approximately 8% moisture content. The air dried pulp was used in acid hydrolysis.

The production of cellulose nanocrystals was based on the procedure described by Beck-Candanedo et al. (Beck-Candanedo et al., *Biomacromolecules* 6:1048-1054 (2006).) Two sets of acid hydrolysis experiments were carried out using strong sulfuric acid solutions with a ratio of solution to pulp in oven dry (od) weight of 8:1 (v/w). Response surface methodology was used to design each set of 17 experiments in two sets of ranges of acid concentration, temperature, and hydrolysis duration. The first set of experiments had larger acid concentration and temperature ranges (Table 2, shown in FIG. 14) than those of the second set of experiments (Table 3, shown in FIG. 15) to coarsely determine the desired acid hydrolysis parameters. A partially hydrolyzed eucalyptus pulp by a commercial cellulase complex (Celluclast 1.5 L, Novozymes, Franklinton, N.C.) was also used in the first set of acid hydrolysis experiments. The enzymatic hydrolysis conditions were cellulase loading of 3 FPU/g glucan at 50° C. for 72 h at 10% pulp solids in dionized (DI) water without pH adjustment or control. Each set of experiments has 3 replicate runs at the center point. Strong sulfuric acid solution was prepared by using sulfuric acid at 98.6 wt. %. Each set of the 17 acid hydrolysis runs were conducted in 17 flasks of capacity 25 mL at the same time. Hydrolysis temperature was controlled using water bath with a temperature controller. The pulp suspension was constantly mixed using a mechanical mixer at 200 rpm during hydrolysis. The reaction was quenched at the end of the designed hydrolysis duration by adding 10-fold of DI water, and then vigorously stirred for 10 mins. The suspension was washed and repeatedly centrifuged at 9000 rpm or approximately 13200 g (Sorvall Superspeed RC2-B, 5.75 inches rotator, Ivan Sorvall, Inc. Norwalk. CT) to remove excessive acid until turbid. The resultant suspension was dialyzed in a regenerated cellulose tube (Fisher Science lot no: 11116-3) with a cutoff molecular weight of 12,000 Da for a week or until pH of the suspension was neutral. Then the suspension underwent an ultrasonic treatment (Fisher Scientific, model FS21H) to disperse the cellulose crystal in an ice bath. The suspension was finally centrifuged for 10 mins at 9,000 rpm, or approximately 13200 g to remove larger agglomerates.

The CNC was separated from the remaining cellulosic solid residual by precipitation. The supernatant contained CNC. Both the volumes and weights of the separated CNC and CSR were recorded. The consistencies of the final cellulose suspension before and after CNC and CSR separation was separately determined by a COD method by digestion in commercial COD test vials (Biosciences, Inc., Bethlehem, Pa.) and by measuring chromium consumption colorametrically at 600 nm using an UV-Vis spectrophotometers (Spectronic Genesys 5, Milton Roy Company, Warminster, Pa.) (American Public Health Association. In *Standard Methods for the Examination of Water and Wastewater,* 16th ed.; Franson, M. H., Ed.; APHA: Washington, D.C., 1985; pp 532-537). Concentrations of cellulosic suspensions were calculated from COD assuming all organic material detected originated from polymeric cellulose as $(C_6H_{10}O_5)_n$. The yields of the CSR samples with high consistency were also measured by oven drying at 105° C. Therefore, the simultaneous production of CNC as well as CSR can be demonstrated. The CSRs were then examined using SEM, which revealed that the CSRs are in the form of CF and CMF, rather than CNC.

The sulfur contents of the CNC and CSR from each run were determined separately by ICP-MS. Aliquots of CNC suspension were taken and analyzed by ICP-MS. For sampling CSR, the CSR suspensions were shaken well before taking a 25 mL sample, which was digested in a microwave oven (MDS-2000, CEM Corp., Matthews, N.C., USA) with approximately 5 mL of $HNO_3$ and 3 mL of 30% $H_2O_2$. The digested samples were then analyzed by ICP-MS. Therefore, the production of negatively charged (sulfate esters) CSR in addition to CNC can be demonstrated. The DPs of the CNCs were separately measured.

Example 2

Simultaneous Production of CNC and CSR—Large Ranges of Acid Concentration and Temperature The COD yield measurements can reveal the existence of cellulosic solids in the milky "CNC" suspension (the quotation marks are used to represent unconfirmed existence of CNC in the suspension). The production of CSR could easily be seen from the precipitated cellulosic fibers in the CSR suspension and the solid yield from oven dry measurements. Table 4 (shown in FIG. 16) lists the yields of the "CNC" and CSR suspension separately measured by COD and gravimetric method through oven drying. The results indicate that a substantial amount (yield >10%) of "CNC" was produced only under a few sets of experimental conditions (experiments No. 2, 11, 12, 14, 15). For the temperatures and hydrolysis durations examined, acid concentrations below 55 wt. % did not produce a significant amount of "CNC", suggesting an abrupt change in CNC production. The maximal "CNC" yields of 40 and 32% from the untreated and enzyme treated pulp, respectively, were achieved in experiment No. 11 under a sulfuric acid concentration of 60 wt. % and temperature of 55° C. for a hydrolysis period of 102 min. (Table 2). The format of (60, 55, 102) is used to represent experimental conditions of (acid wt. %, run temp. ° C., run time min) throughout this disclosure. Furthermore, a substantial amount of cellulosic solid (insoluble) residual was produced and easily recovered from the untreated and enzyme treated pulp with yields ("CSR") of 32 and 42%, respectively. The "CNC" yield from the untreated pulp sample at (65, 50, 75) was 27%, similar to those reported in the literature using acid concentration of 64 wt. %. (Bondeson et al., *Cellulose* 13:171-180 (2006); Hamad et al., *The Canadian J. Chemical Engineering* 88:392-402 (2010).) However, no substantial amount of non-CNC cellulosic solid was produced at (65, 50, 75). This indicates that the remaining cellulose was completely hydrolyzed by acid to soluble sugars or other soluble byproducts that cannot be economically recovered.

Figure 2A:
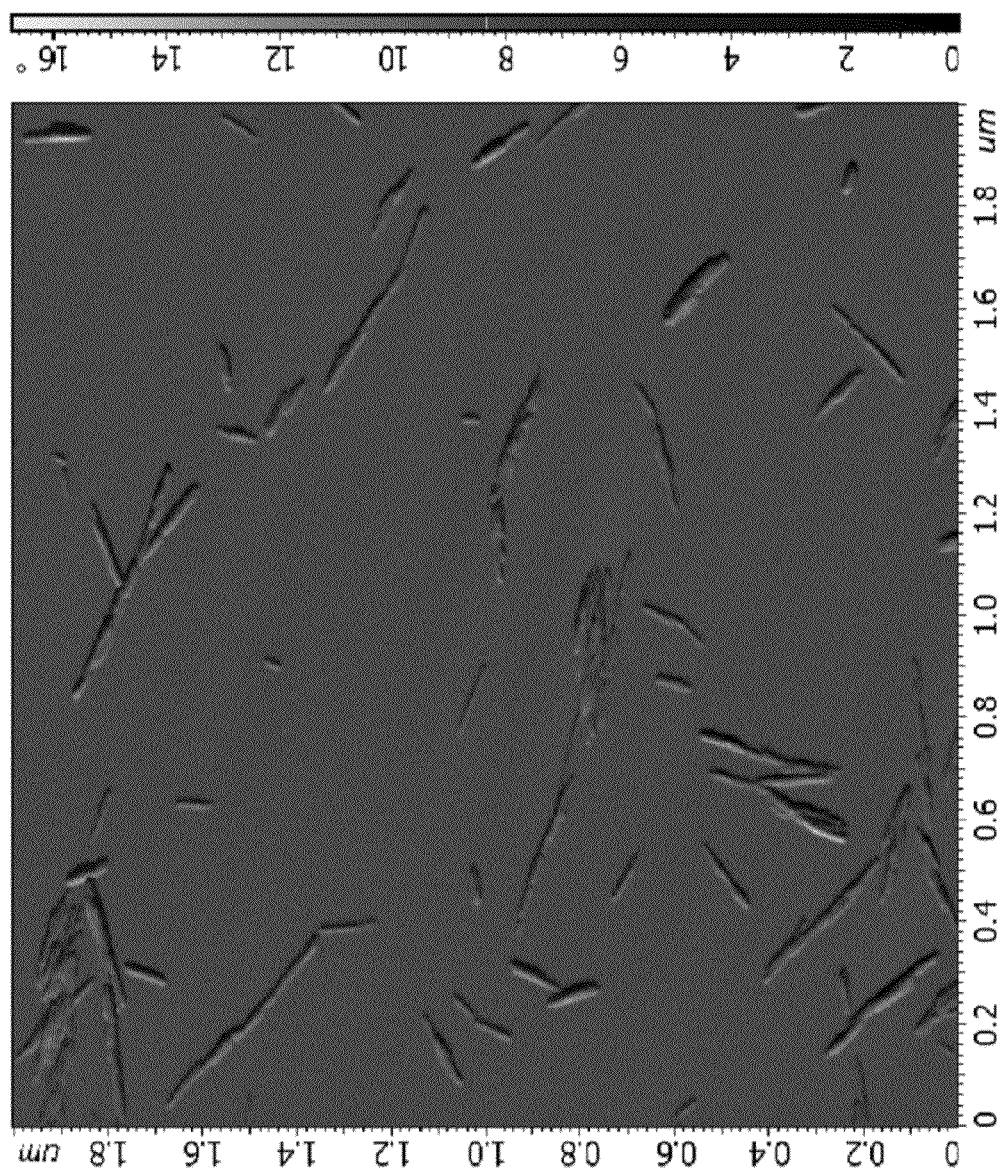
FIG. 2 AFM phase images of two CNC samples from (a) (60, 55, 102) and (b) (65, 50, 75).
Figure 2B:
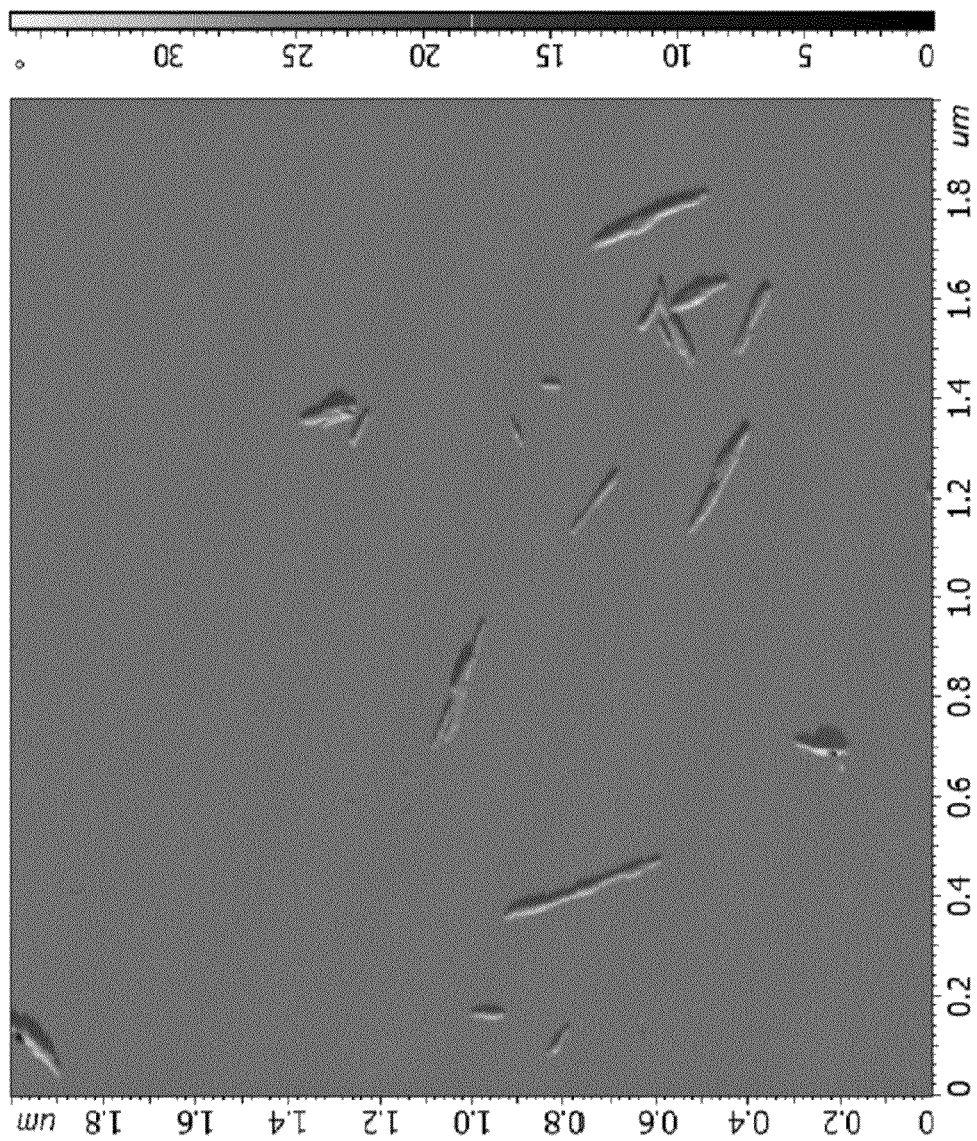
Figure 3:
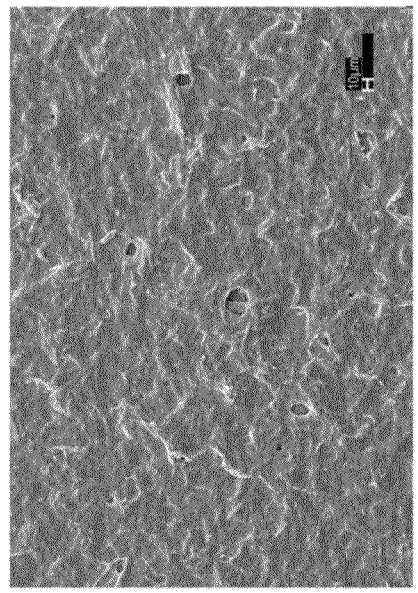
FIG. 3 SEM images of the cellulosic solid residual (CSR) from (a) (60, 55, 102); (b) (55, 65, 75); (c) (60, 45, 102); and (d) (60, 55, 48).
Figure 3:
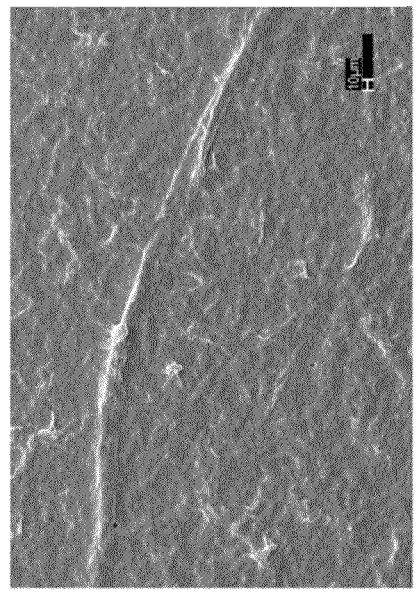
Figure 3:
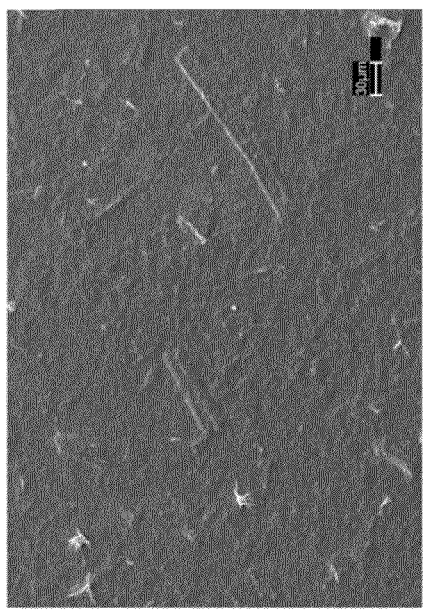
Figure 3:
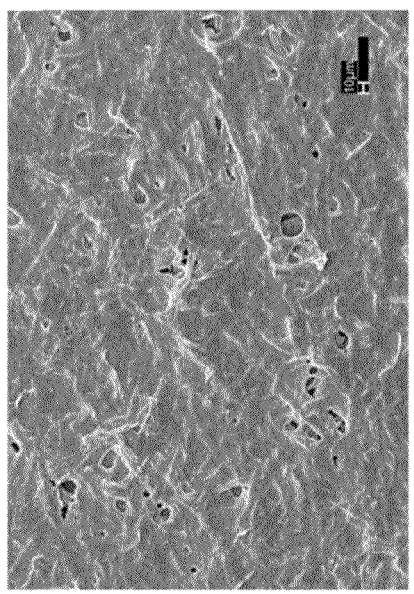

AFM imaging can reveal whether or not the "CNC" are in the form of nano whiskers. Only the results from the eucalyptus pulp without enzyme pretreatment will be discussed in this paragraph. The AFM image of the resultant "CNC" sample from (60, 55, 102) with CNC yield of 40% indicates that the cellulosic solids in the CNC sample are individually separated nano whiskers (FIG. 2A). When acid hydrolysis was conducted at 65 wt. % acid concentration (65, 50, 75), the resultant CNC particles are more uniform in length (FIG. 2B). The yield however is reduced to 27% and without significant (~5%) remaining "CSR". Significant amounts (32%) of "CSR" in the form CMF and CF (FIG. 3A) was obtained under a slightly lower acid concentration condition (60, 55, 102). The SEM images of the "CSR" obtained from other four runs with significant CNC yield are shown in FIG. 3. The form of "CSR" whether in CF or CMF depends on the severity of the hydrolysis conditions. The CNC obtained in these four sets of acid hydrolysis conditions all contained significant sulfate ester groups based on sulfur measurements (Table 4, shown in FIG. 16).

Figure 4:
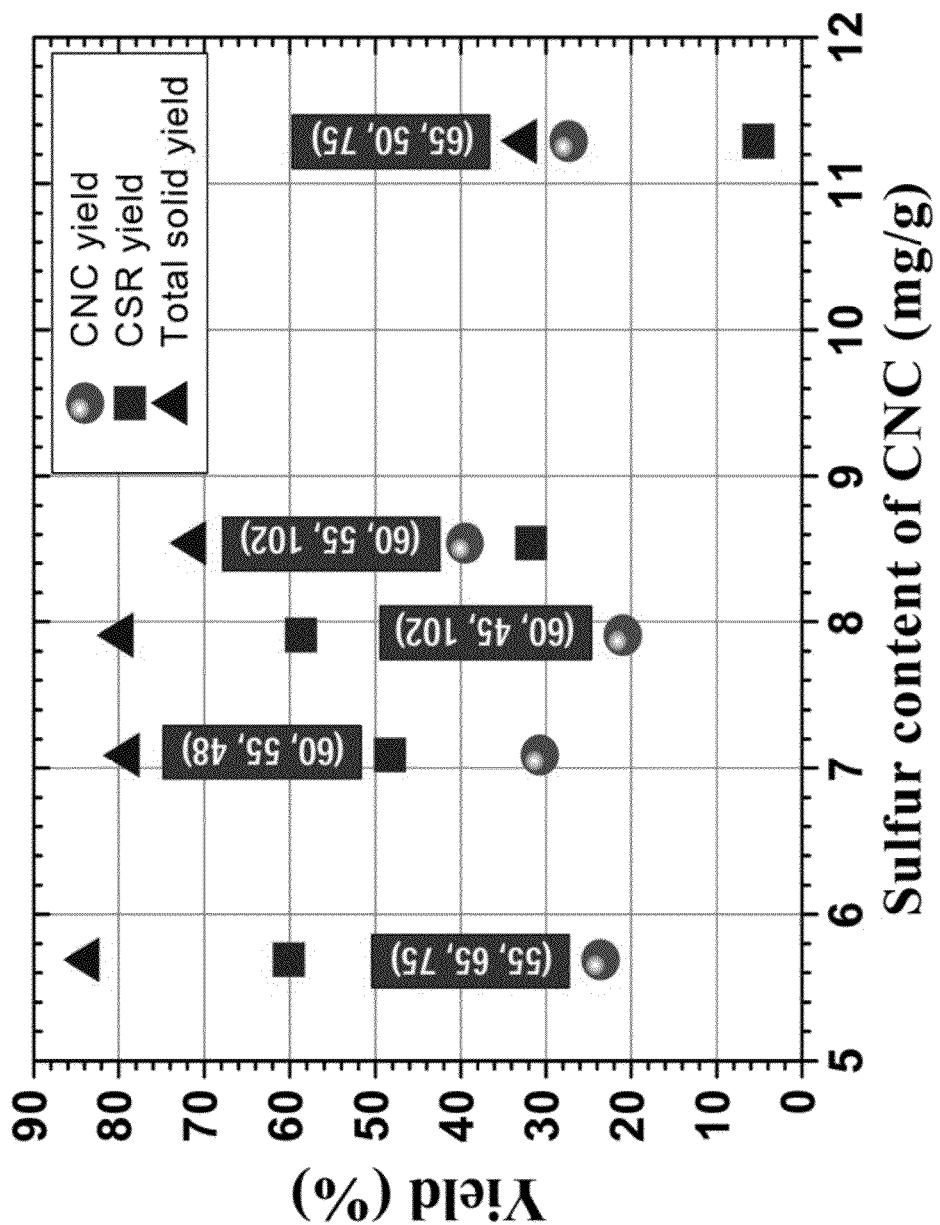
FIG. 4 Correlations between sulfur content in CNC with CNC, CSR, and total solid yield from the first set of acid hydrolysis experiments from tables 2 and 4.

To further demonstrate the simultaneous production of CNC and CSR, the yield of CNC, CSR, and total of CNC and CSR were plotted against CNC sulfur content (FIG. 4). The results clearly indicate that CNC sulfur content, a measure of the degree of sulfation and the degree of acid hydrolysis severity, inversely proportional to CSR yield. The CNC yield, however, first increased with sulfation and then decrease rapidly. This is because at very low acid hydrolysis severities, the cellulose has not been hydrolyzed to non whisker. Therefore, increasing hydrolysis severity can increase CNC yield. However, further increasing hydrolysis severity beyond the maximal CNC yield condition, decreased CNC yield due to degradation to sugars. The total solid yield was also inversely proportional to CNC sulfur content. The results in FIG. 4 indicate that there is a range of acid hydrolysis severities within which simultaneous productions of CNC with a good yield of approximately 30% and good sulfonation, as indicated by a sulfur content between 7-9 mg/g, and CSR with a good yield of approximately 50% can be achieved.

Example 3

Simultaneous Production of CNC and CSR—Narrow Ranges of Acid Concentration and Temperature The abrupt change in CNC production reported in Example 2 was unsuitable for linear regression analysis to accurately predict the optimal conditions for CNC and CSR production. Therefore, a separate set of experiments (Table 3) with narrowed ranges of acid concentration and temperature were conducted to fine tune the operating conditions for simultaneous CNC and CSR production. Again the yields of CNC were measured by COD at least in duplicate. The yields of CSR were also measured by both COD. Due to difficulties in obtaining representative sampling using aliquots of CSR pulp suspension, the COD results were listed as reference. The gravimetric yields were used. However, gravimetric measurements were not conducted on those CSR samples with very low yield, the COD yields were used. The results indicate that 12 out of the 17 experiments, including the 3 replicate runs at the center point (62, 50, 70) produced significant amounts (yield >10%) of CNC (Table 5, shown in FIG. 17). Furthermore, 7 out of the 17 experiments resulted in a significant CSR yield. Under 5 different experimental conditions, both the yields of CNC and CSR were significant (>110%). While the center point had a high CNC yield with a mean value of 55.8%, the CSR yield was negligible at less than 1%, clearly indicating the remaining cellulosis solid of approximately 43% including 18% cellulose were degraded into soluble compounds, such as sugars, during hydrolysis.

At (58, 56, 100), the CNC yield was 55.7%, approximately equal to the yield obtained at the center point (62, 50, 70) of 55.8%. However, the run resulted in a CSR yield of 17.4%. The total yield for this run was 73.1%, indicating only approximately 27% of the solid was degraded to soluble sugars. Because xylan hydrolysis is much faster then cellulose, it can be said most of the hydrolyzed carbohydrate are xylan, not cellulose, i.e., cellulose loss is minimal. Comparing to the center point run (62, 50, 70), a net of 16% cellulosic solid can be recovered without the reduction in CNC yield. When the hydrolysis duration was reduced to 40 min. at (58, 56, 40), the CNC yield was reduced by 50% to 27.5%. Comparing the run (58, 56, 100) and the center point run (62, 50, 70), the total yield of CNC and CSR was 84.1%, i.e., degradation of cellulosic material to soluble sugars was reduced to only 16%. When the hydrolysis temperature was reduced to 44° C. at (58, 44, 100), CNC yield was reduced to 16.2% with CSR yield increased to 61.3% with a total cellulosic solid yield of 77.5%.

These experiments demonstrate the production of a cellulosic solid residual (CSR) with the production of CNC with significantly reduced cellulose degradation into soluble sugars.

Figure 5:
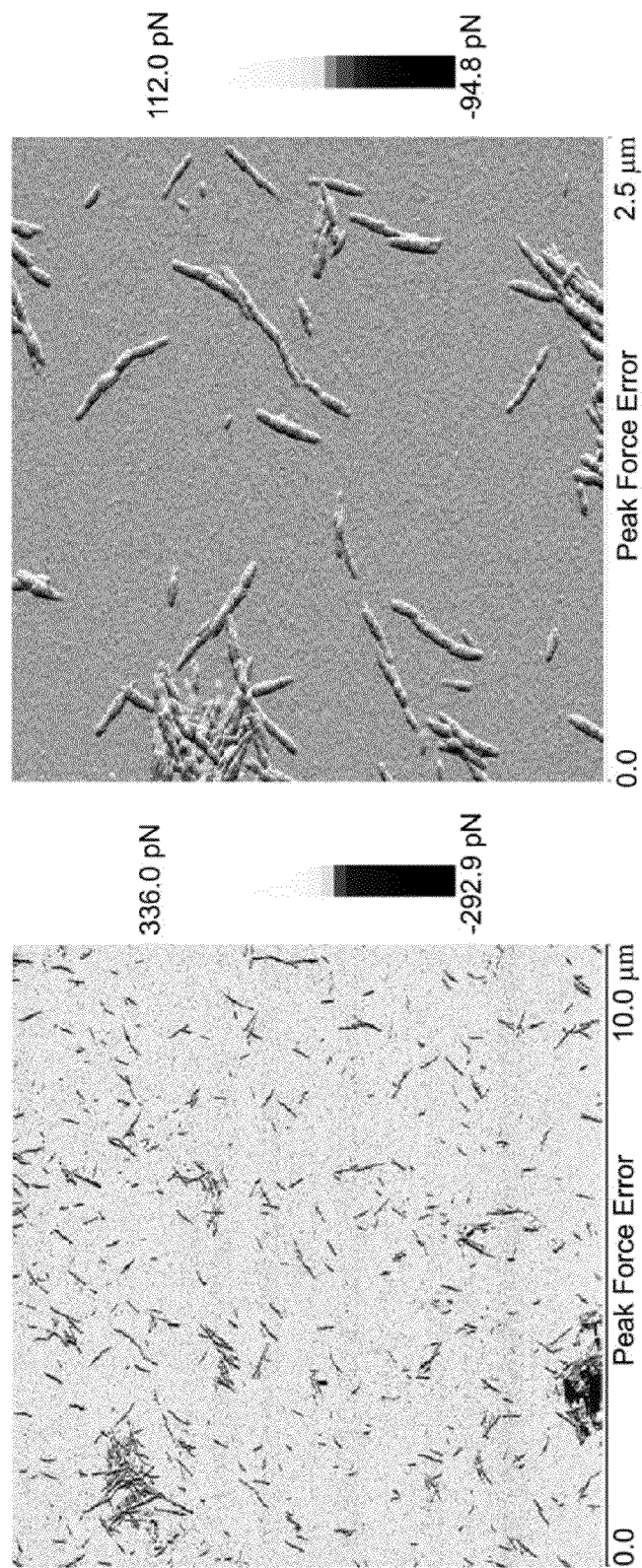
FIG. 5 AFM phase images of a CNC samples from the center point (62, 50, 70) at two magnifications.
Figure 6:
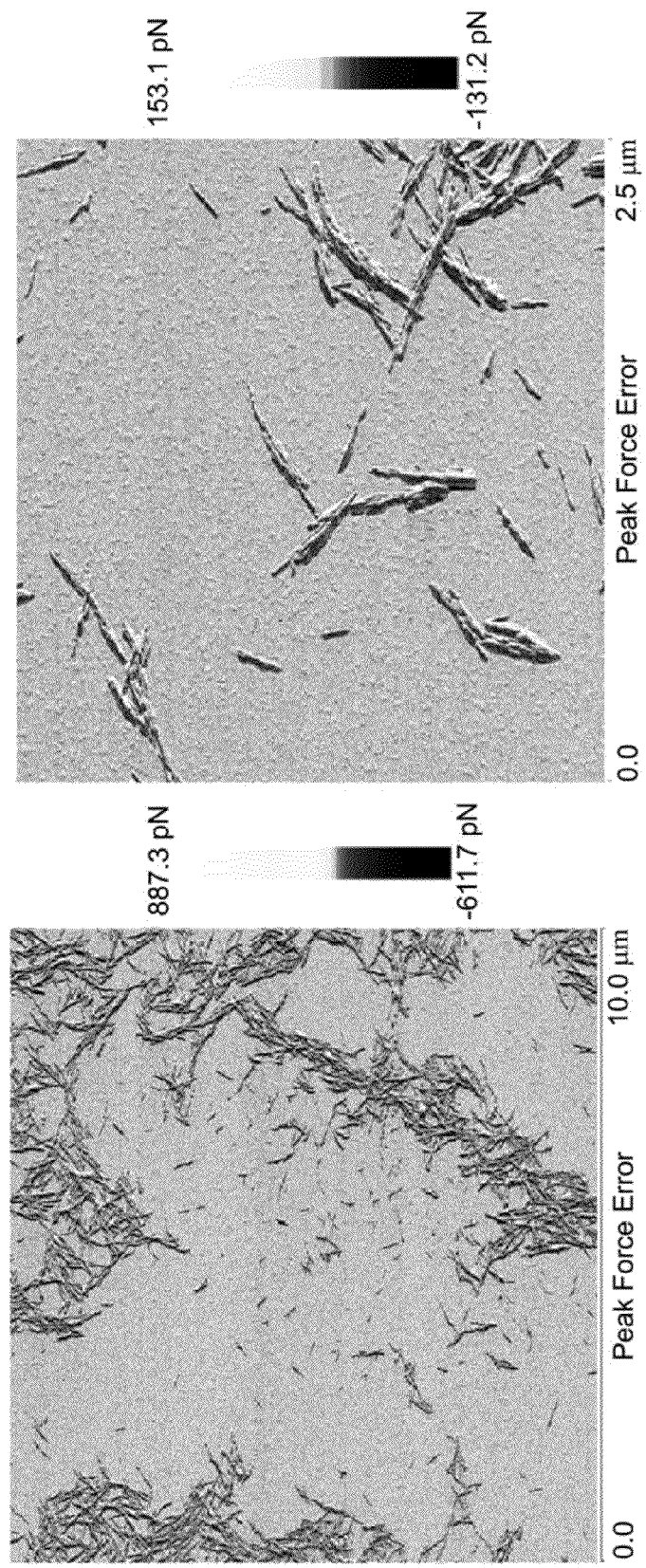
FIG. 6 AFM phase images of a CNC samples from (58, 56, 100) at two magnifications.
Figure 7:
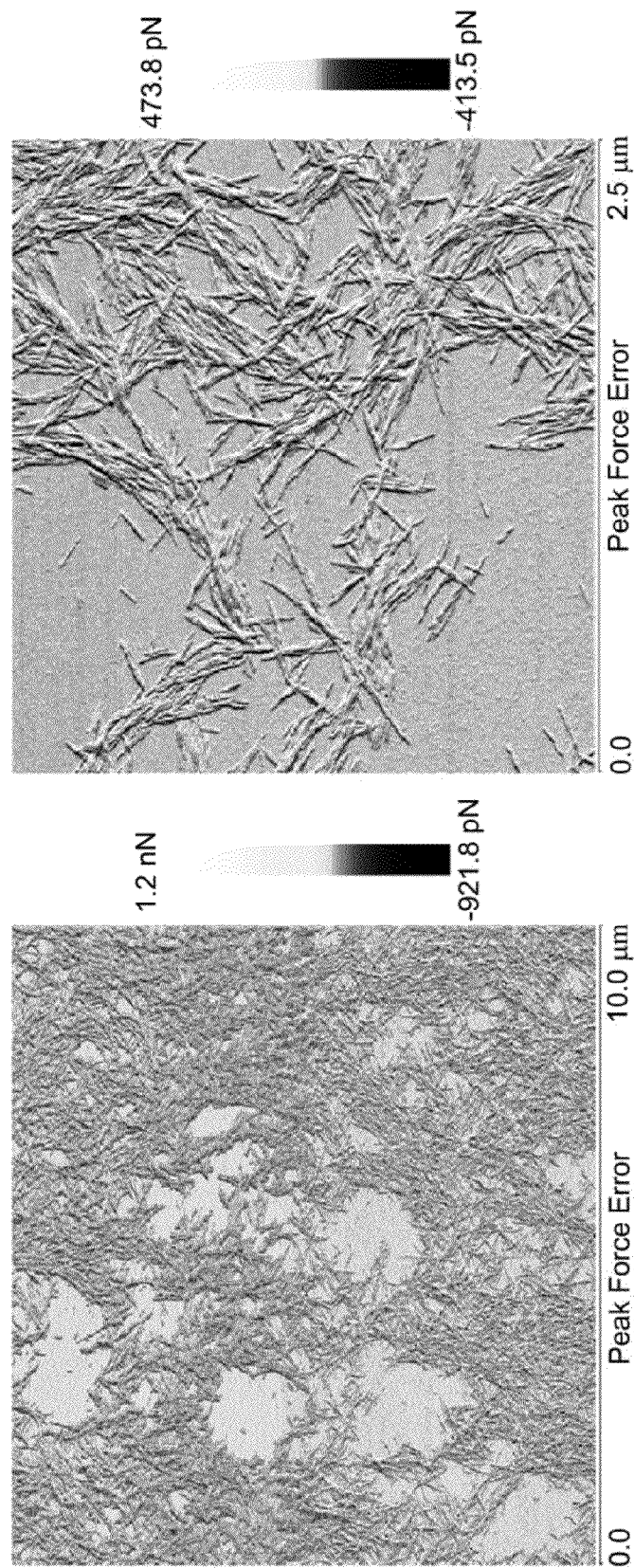
FIG. 7 AFM phase images of a CNC samples from (58, 56, 40) at two magnifications.
Figure 8:
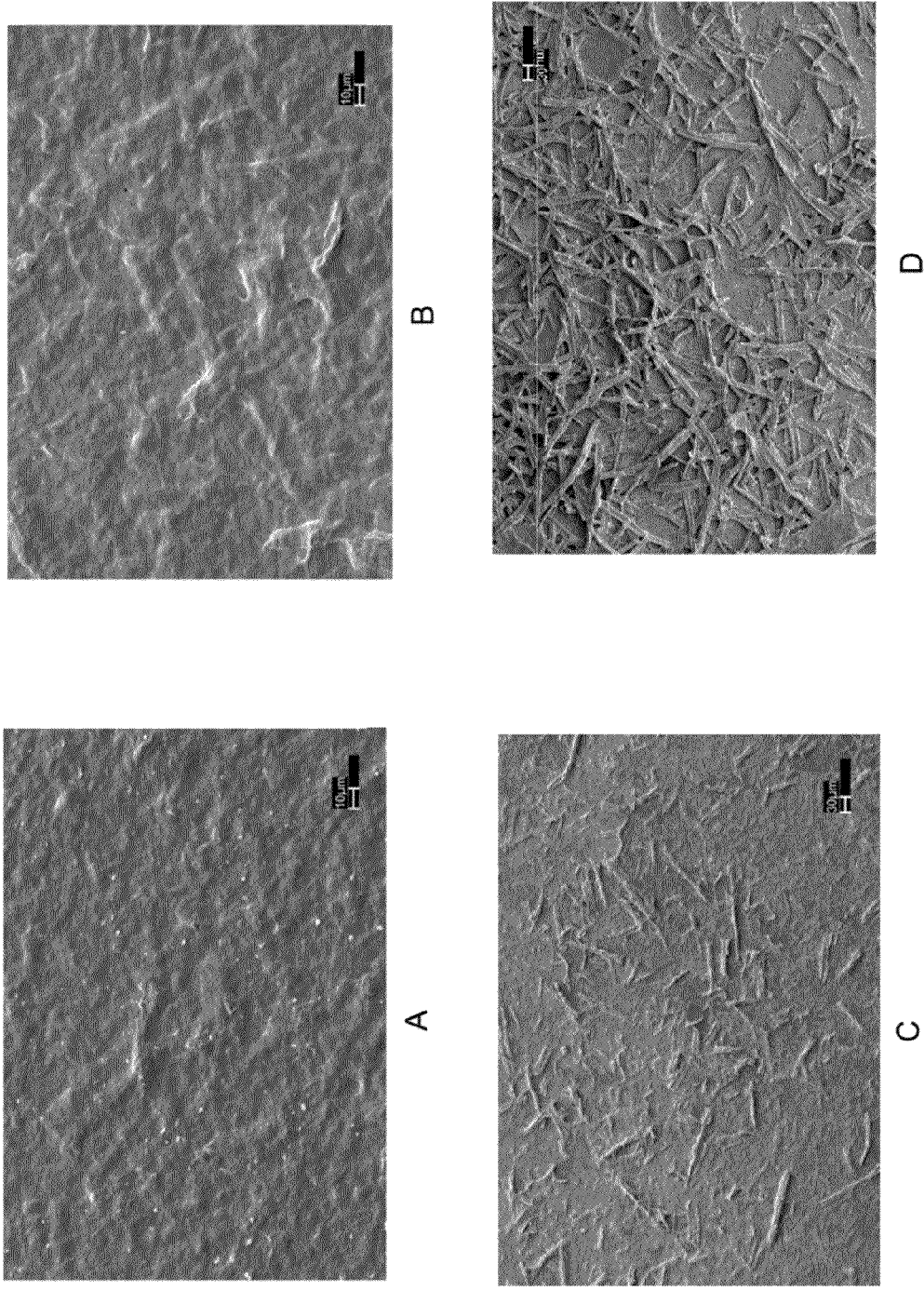
FIG. 8 SEM images of the cellulosic solid residual (CSR) from (a) (58, 56, 100); (b) (58, 56, 40); (c) (62, 50, 20); and (d) (58, 44, 100).

AFM images revealed the morphologies of the CNCs. As shown in FIGS. 5 and 7, the differences in the morphologies of the CNC produced under different net conditions are negligible. Image analyses of the crystals length distribution contained from these three runs are almost identical. The SEM images of the CSR samples from the runs with significant CNC yield (>10%) indicated the CSR samples are in form of CF or CMF, depending on the severity of the acid hydrolysis (FIG. 8).

Example 4

Sulfonation of CNC and CSR

Figure 9A:
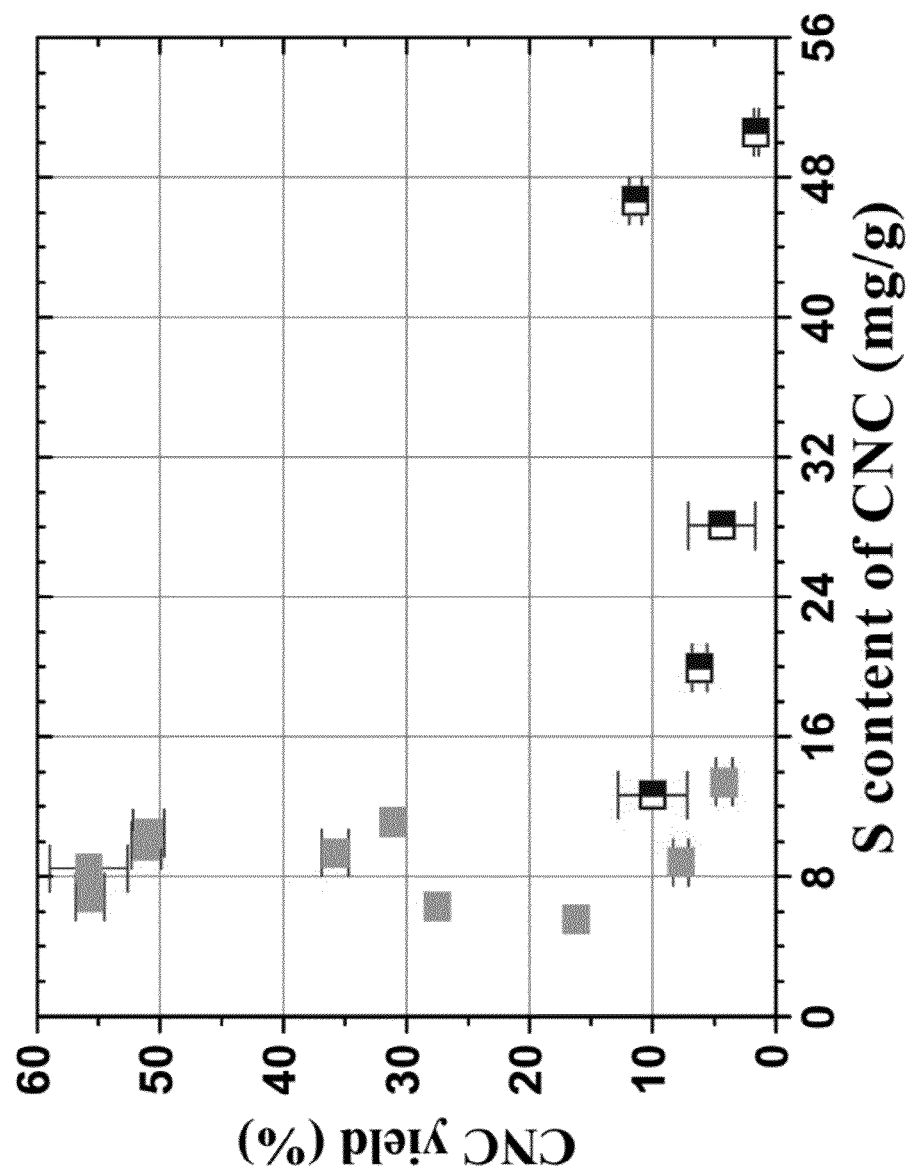
FIG. 9 Correlation between CNC yield and the sulfur content of the resultant CNC; (a) all data point; (b) zoom view of (a) with S content between 4-14 mg/g.
Figure 9B:
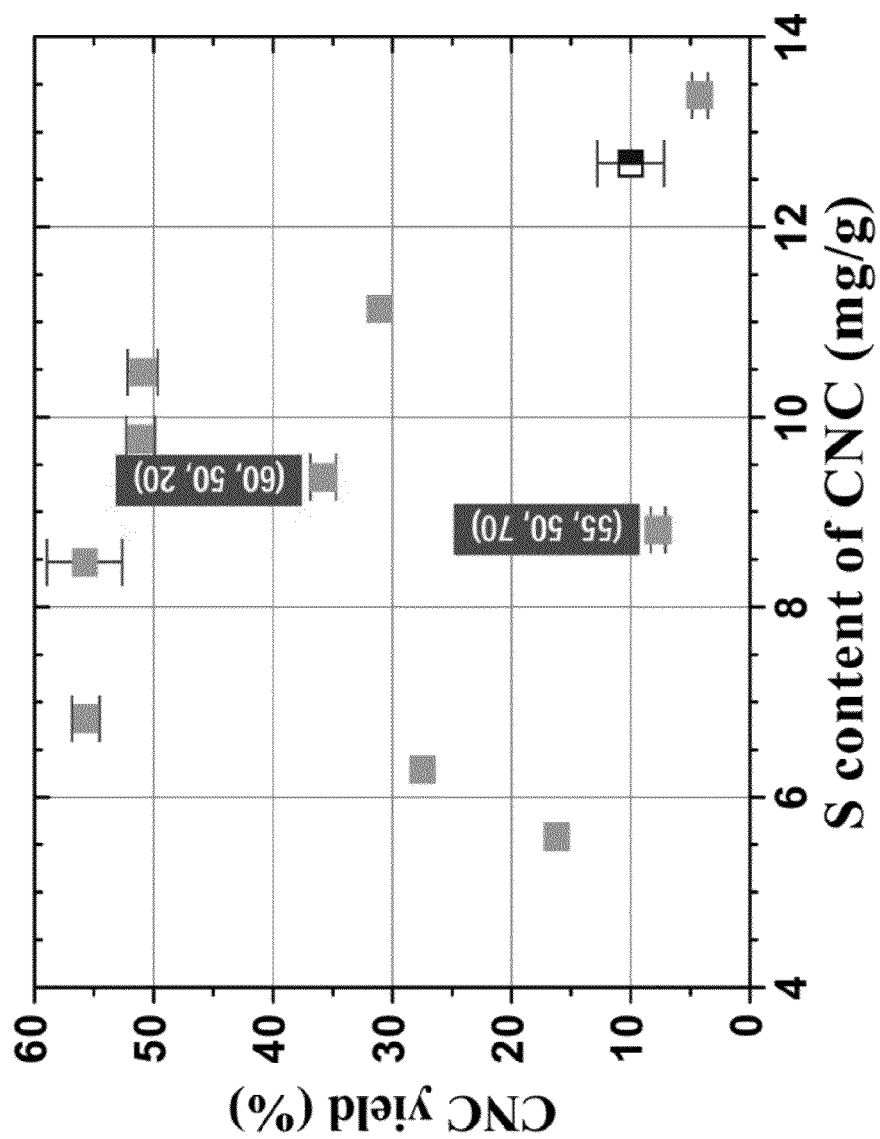

The CNC yields from this example are shown in FIG. 9. The results indicate that increased sulfonation, as represented by the sulfur content of the CNC, due to increased acid hydrolysis severity through a combination of acid concentration, temperature, and hydrolysis duration, results in decreased CNC yield. The half-filled symbols shown in FIG. 9A are runs with acid concentration greater than 64 wt. % and the center point value of 62 wt. %, or runs with high severities. It is expected that CNC yield should first increase with hydrolysis severity, as represented by sulfur content (sulfonation), to achieve a maximal value than decrease due to cellulose degradation to soluble products. To illustrate this, one can zoom in on the results in FIG. 9A with sulfur contents between 4-14 mg/g, a similar range to that in FIG. 4. The zoom view indicates that CNC yield first increases with sulfur content to achieve a maximal sulfur content between 7 to 10 mg/g, then decreases. There are two data points that do not conform to this general trend. These two runs are the run with lowest temperature and the run with the shortest hydrolysis duration, respectively. This suggests that sulfur content may be an imperfect measure of hydrolysis severity for extreme conditions.

Figure 10:
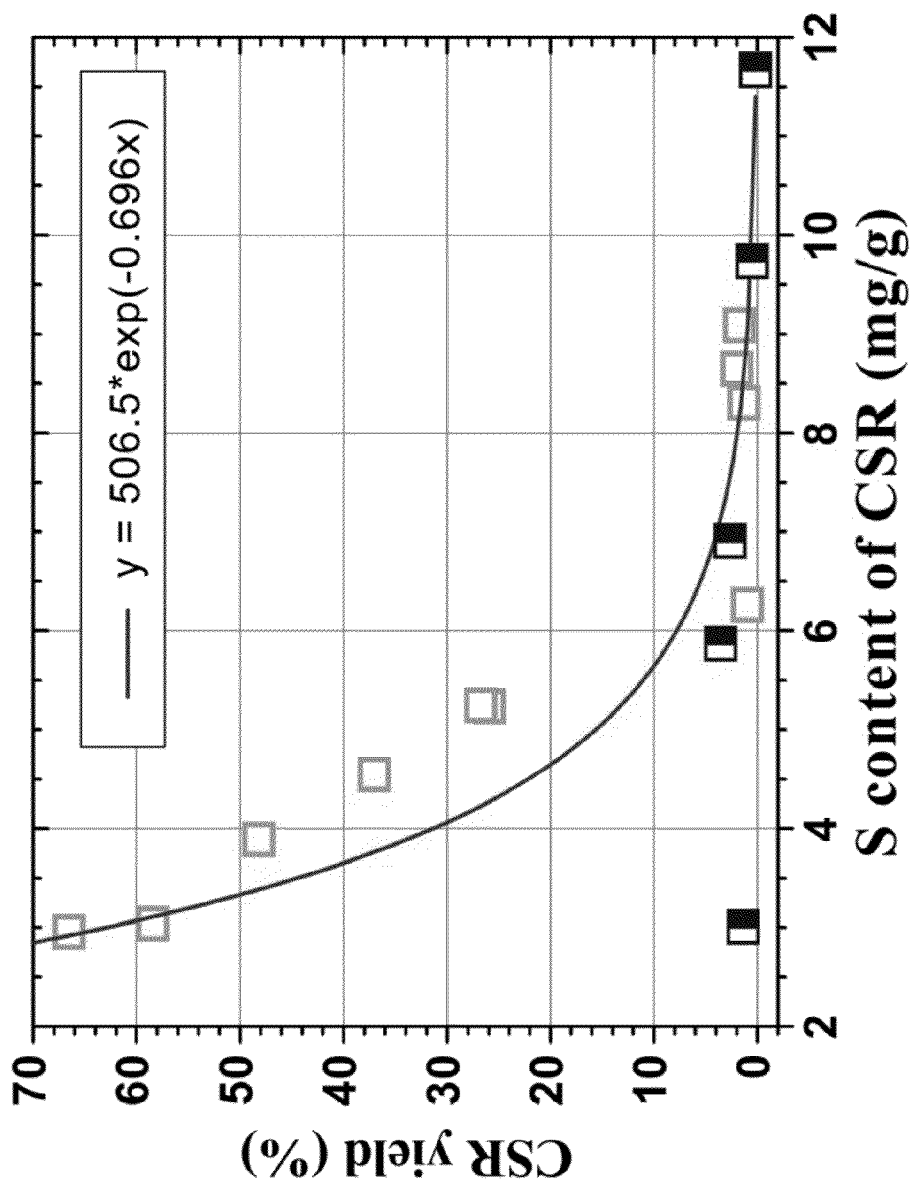
FIG. 10 Correlation between CSR yield and sulfur content of the resultant CSR.

This example also confirmed that the CSR contained negatively charged sulfate ester groups when sulfuric acid was used in the acid hydrolysis. The results in Table 5 indicate that the CSR resulting from the second set of experiments contained sulfur. The sulfur content of CSR from Run 4 at (62, 50, 70) is apparently an outlier as the other two replicate experiments showed a much lower sulfur content of less than 10 mg/g. The sulfur content of CSR from Run 13 at (58, 44, 100) may also contain large measurement errors as it is higher than that of the corresponding CNC sample. The difficulties in obtaining a representative sample by aliquot sampling of the pulp suspension may cause deviation in the amount samples actually taken from that prescribed, which produced errors in sulfur content data. These two data points were removed in FIG. 10, which shows the correlation between CSR yield and sulfur content of the resultant CSR samples. Except for one data point (outlier based on results from similar runs), the CSR yield can be fitted to an exponential decay with the sulfur content of the CSR samples. The half-filled symbols were run with acid concentrations greater than 64 wt. % or the value at the center point of 62 wt. %. FIG. 10 also indicates that for hydrolysis runs with CSR yields in the range of 25-50%, the sulfur contents of the resultant CSR were between 4 to 5 mg/g, suggesting the CSR were negatively charged with sulfate ester groups. The sulfur content of CSR was proportional to the sulfur content of CNC (Table 5).

Example 5

CNC Yield and Empirical Combined Severity Factor

Figure 11A:
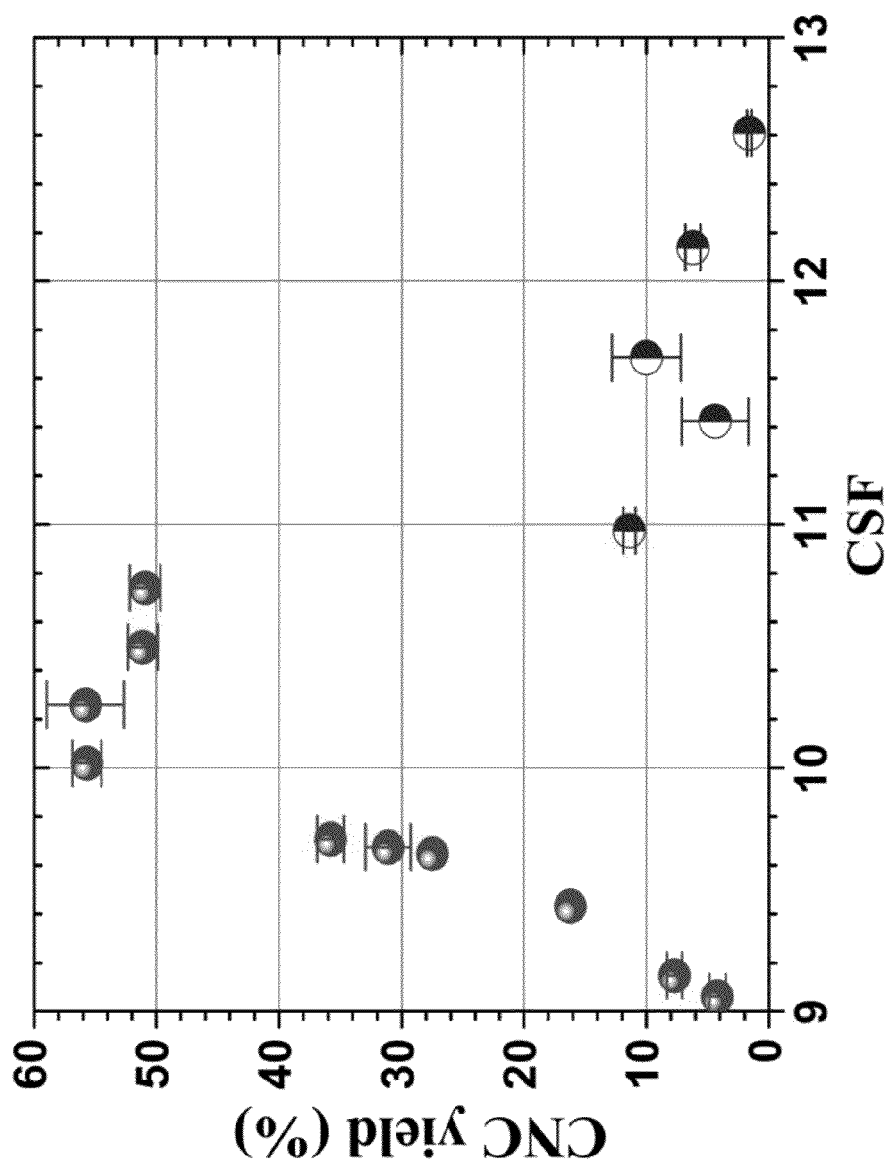
FIG. 11 Correlations of (a) CNC yield and (b) CSR yield with an empirical combined severity factor for acid hydrolysis.
Figure 11B:
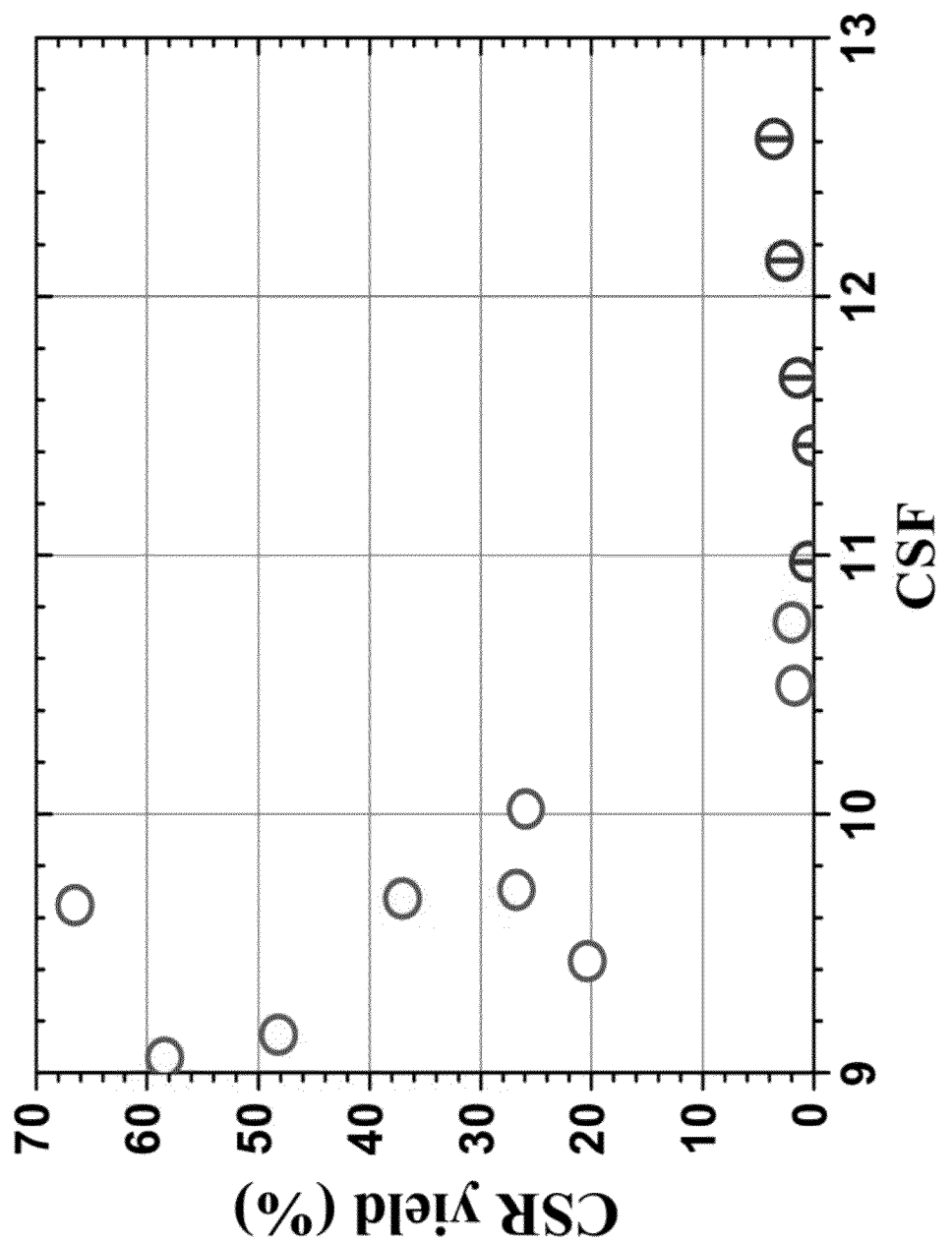

The discussion in Example 4 suggests sulfur content can fail to represent acid hydrolysis severity under certain conditions. Therefore, an empirical combined hydrolysis severity (ECHS) was developed, as shown in Equation (1), based on a combined severity factor (CSF) derived from kinetics (Chum et al., *Applied Biochemistry and Biotechnology* 24/25, p. 1-14 (1990)).

$$ECHS = \text{Log}\left[\frac{T}{T_{cp}} \cdot t^6\right] \cdot \left(\frac{A}{A_{cp}}\right)^\beta \tag{1}$$

where subscript cp stands for the center point value, A is acid concentration, $A_{cp}$=62 wt. %, and $\beta$=1 for acid concentration $A \leq A_{cp}$; $\beta$=2 when $A > A_{cp}$. It was found that using the acid concentration in wt. % produced better correlation than using the molar concentration (related to pH) for the CNC yield shown in FIG. 11A. The results show that CNC yield was between 30 to 55% for ECHS between 9.6 to 10.8. Similarly, the CSF with CSR yield was plotted (FIG. 11B). Significant amounts of CSR can be obtained for ECHS between 9 and 10. By simultaneously examining FIGS. 11A and 11B, it can be concluded that significant amounts of both CNC and CSR can be produced using ECHS between 9.5 to 10. FIG. 11A also clearly shows the abrupt change in CNC yield, i.e., significant amount of CNC yield may be possible only within a narrow range of ECHS factors between 9.6 to 10.8. The ECHS range that can simultaneously produce a significant amount of CNC and negatively charged CSR is even narrower, between 9.5 to 10, for the particular system studied here.

Example 5

Cellulose Nano Fibrils (CNF) Production from CSR

Figure 12A:
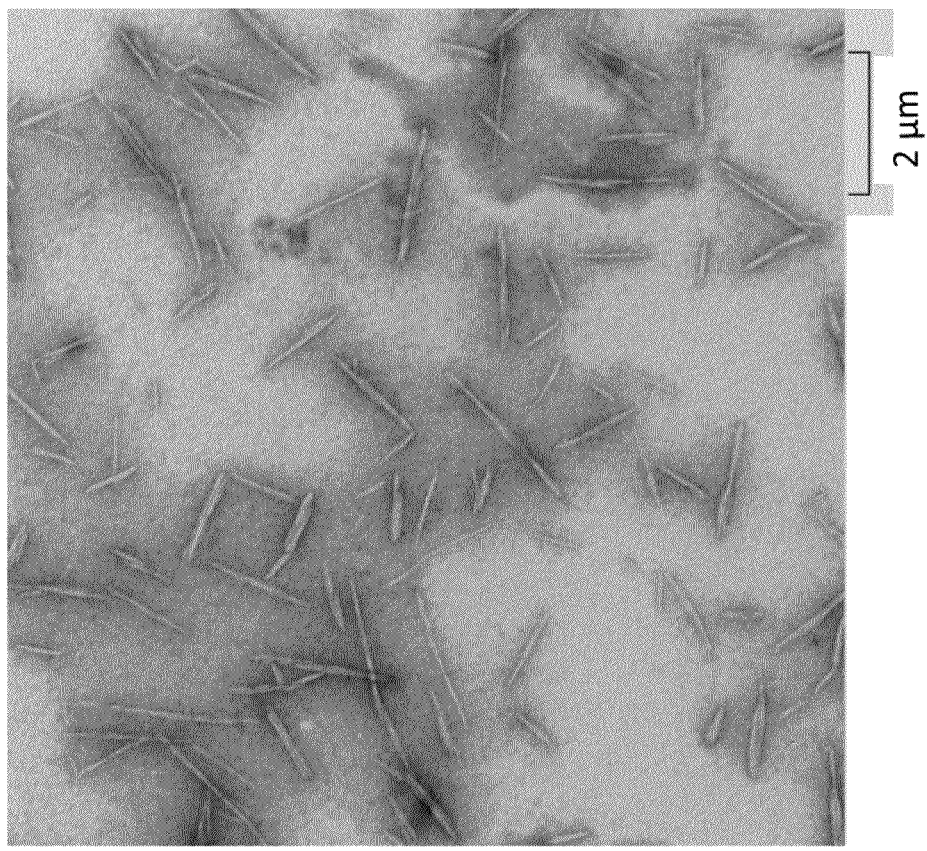
FIG. 12 TEM images of CNFs produced from CSR samples produced at two acid hydrolysis conditions. (A): (62, 40, 70); (B): (58, 56, 40).
Figure 12B:
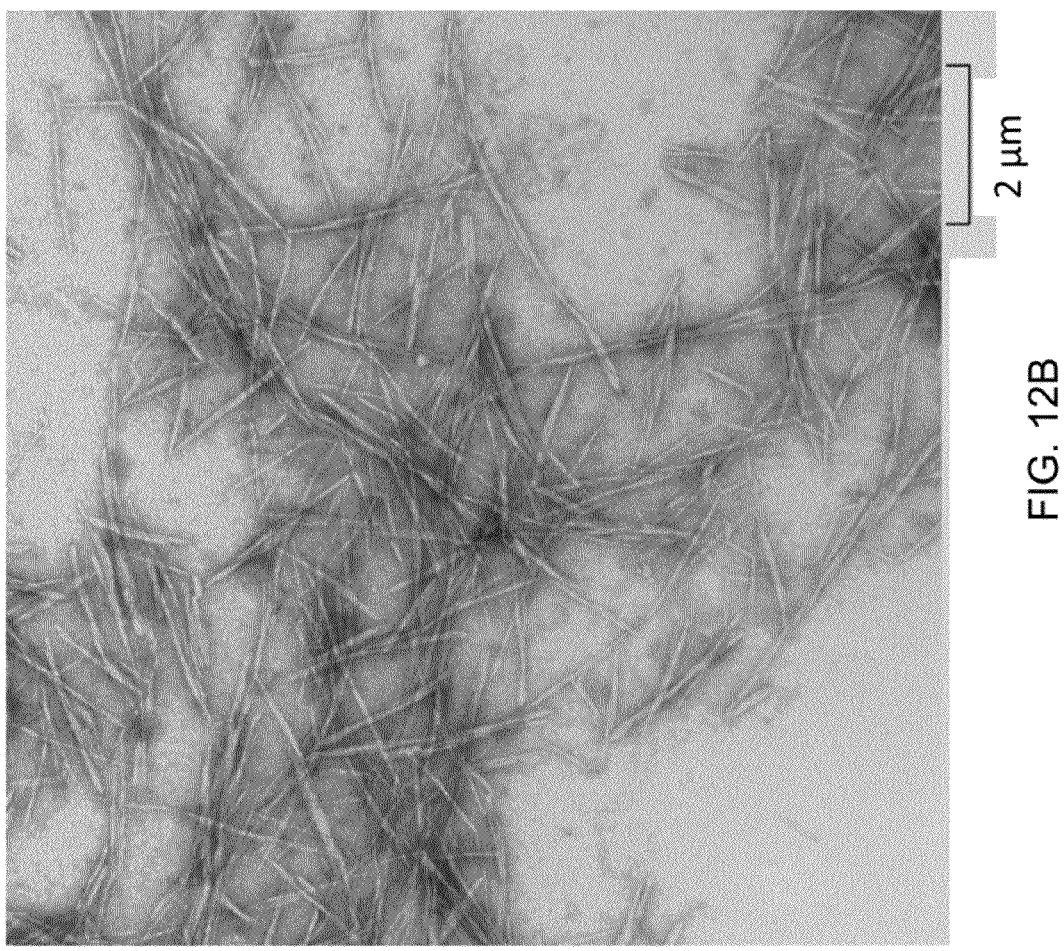

A separate acid hydrolysis experiment at (58, 56, 40) and (62, 40, 70) with large capacity of 100 g was conducted to obtained sufficient CSR sample to produce CNF through mechanical shearing. A microfluidizer (Microfluidics, Newton, Mass.) was employed. It was found CSR can be easily fibrillated to cellulose nanofibrils (CNFs) with minimum mechanical energy input or passes (total of 15 at solids loading of 2%). TEM imaging indicates that the morphologies of the resultant nanocellulose depend on CSR. Nanowhiskers with length between 100-200 nm were obtained from CSR produced at (62, 40, 70) or ECHS=9.67 (FIG. 12A). Relatively longer nanowhiskers or nanofibers of 200-400 nm were obtained using CSR from (58, 56, 40) or ECHS=9.65 (FIG. 12B). Further evaluation the properties of these nanowhiskers need to be conducted in the future to access their utility.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A material comprising at least 50 wt. %, based on a solid content of the material, of cellulose particles, wherein the cellulose particles comprise surface ester functionalities and are selected from the group consisting of cellulose fibers, cellulose microfibers and cellulose nanofibrils.

2. The material of claim 1, comprising at least 95 wt. %, based on the solid content of the material, of cellulose particles, wherein the cellulose particles comprise the surface ester functionalities and are selected from the group consisting of cellulose fibers, cellulose microfibers and cellulose nanofibrils.

3. The material of claim 1 comprising no greater than about 5 wt. %, based on the solid content of the material, of cellulose nanocrystals.

4. The material of claim 1, wherein the ester functionalities are sulfate ester functionalities.

5. The material of claim 1, wherein the ester functionalities are phosphate ester functionalities.

6. The material of claim 1, wherein the cellulose particles are cellulose nanofibrils.

7. The material of claim 1, wherein the cellulose particles are cellulose fibers, cellulose microfibers, or a combination thereof.

8. A method for the production of cellulose nanofibrils from cellulosic solids comprising cellulose fibers, cellulose microfibers, or a combination thereof, the method comprising subjecting the cellulosic solids to mechanical shear forces, whereby the cellulose nanofibrils are formed and further wherein the cellulose fibers, cellulose microfibers and cellulose nanofibrils comprise surface ester functionalities.

9. The method of claim 8, wherein the ester functionalities are sulfate ester functionalities.

10. The method of claim 8, wherein the ester functionalities are phosphate ester functionalities.

11. A method for the production of cellulose nanofibrils from a cellulosic material comprising crystalline cellulosic components and amorphous cellulosic components, the method comprising:
    (a) hydrolyzing amorphous cellulosic components in the cellulosic material via an acid hydrolysis to obtain a cellulosic solid comprising cellulose nanocrystals and cellulosic solid residues, the cellulosic solid residues comprising cellulose fibers, cellulose microfibers, or a combination thereof;
    (b) separating the cellulose nanocrystals from the cellulosic solid residues; and
    (c) subjecting the cellulosic solid residues to mechanical shear forces, whereby the cellulose nanofibrils are formed.

12. The method of claim 11, wherein the total cellulosic solid yield for the method is at least 55 wt. %.

13. The method of claim 11, wherein the total cellulosic solid yield for the method is at least 80 wt. %.

14. The method of claim 11, wherein an acid used in the acid hydrolysis comprises sulfuric acid and further wherein the cellulosic solid residues and the cellulose nanofibrils comprise surface sulfate ester functionalities.

15. The method of claim 11, wherein an acid used in the acid hydrolysis comprises phosphoric acid and further wherein the cellulosic solid residues and the cellulose nanofibrils comprise surface phosphate ester functionalities.

16. The method of claim 11, wherein the cellulosic solid comprises at least 10 wt. %, based on a solid content, of the cellulosic solid residues.

17. The method of claim 11, wherein the cellulosic solid comprises at least 30 wt. %, based on a solid content, of the cellulosic solid residues.

18. The method of claim 11, wherein the cellulose fibers, cellulose microfibers and cellulose nanofibrils comprises surface ester functionalities and the total cellulosic solid yield, based on a cellulose content of the cellulosic material, is at least 55 wt. %.

19. The method of claim 11, wherein the cellulosic solid comprises at least 5 wt. %, based on a solid content, of the cellulosic solid residues.

* * * * *